US012695545B2

(12) United States Patent
Yamamoto et al.

(10) Patent No.: US 12,695,545 B2
(45) Date of Patent: Jul. 28, 2026

(54) TERMINAL, BASE STATION, AND COMMUNICATION METHOD WITH REPETITION TRANSMISSION CONTINUATION OR TERMINATION BASED ON A DETERMINED CONDITION

(71) Applicant: Panasonic Intellectual Property Corporation of America, Torrance, CA (US)

(72) Inventors: Tetsuya Yamamoto, Kanagawa (JP); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 28 days.

(21) Appl. No.: 18/576,082

(22) PCT Filed: May 6, 2022

(86) PCT No.: PCT/JP2022/019560
§ 371 (c)(1),
(2) Date: Jan. 2, 2024

(87) PCT Pub. No.: WO2023/013192
PCT Pub. Date: Feb. 9, 2023

(65) Prior Publication Data
US 2024/0333428 A1 Oct. 3, 2024

(30) Foreign Application Priority Data
Aug. 2, 2021 (JP) ................................. 2021-126684

(51) Int. Cl.
*H04L 1/08* (2006.01)
*H04W 28/06* (2009.01)

(52) U.S. Cl.
CPC ............... *H04L 1/08* (2013.01); *H04W 28/06* (2013.01)

(58) Field of Classification Search
CPC ......... H04L 1/0009; H04L 1/08; H04L 1/189; H04W 28/06
See application file for complete search history.

(56) References Cited

U.S. PATENT DOCUMENTS

| 2019/0313436 | A1* | 10/2019 | Lee | ........................ H04L 5/0094 |
| 2020/0221474 | A1* | 7/2020 | Lee | ........................ H04L 1/1896 |

(Continued)

FOREIGN PATENT DOCUMENTS

| WO | 2019216745 A1 | 11/2019 |
| WO | WO 2021211728 A1 | 10/2021 |
| WO | WO 2022212275 A1 | 10/2022 |

OTHER PUBLICATIONS

3GPP, "3rd Generation Partnership Project; Technical Specification Group Radio Access Network; NR; Base Station (BS) radio transmission and reception (Release 15)," 3GPP TS 38.104 V15.14.0, Jun. 2021. (242 pages).

(Continued)

*Primary Examiner* — Albert Decady
*Assistant Examiner* — Enamul M Kabir
(74) *Attorney, Agent, or Firm* — Seed Intellectual Property Law Group LLP

(57) ABSTRACT

This terminal is provided with: a transmitting circuit which performs repeated transmission of a signal; and a control circuit which, if a portion of the repeated transmission is not performed, determines whether to continue the repeated transmission or to terminate the repeated transmission, on the basis of whether a determination condition is satisfied.

14 Claims, 16 Drawing Sheets

(56) References Cited

U.S. PATENT DOCUMENTS

| | | | |
|---|---|---|---|
| 2020/0305131 A1* | 9/2020 | Chatterjee | H04W 72/21 |
| 2021/0352627 A1* | 11/2021 | Taherzadeh Boroujeni | |
| | | | H04W 72/02 |
| 2022/0046671 A1* | 2/2022 | Yang | H04L 5/0053 |
| 2022/0123865 A1* | 4/2022 | Sridharan | H04L 1/08 |
| 2022/0123902 A1* | 4/2022 | Panteleev | H04L 1/1887 |
| 2023/0163882 A1* | 5/2023 | Bae | H04W 72/0446 |
| | | | 370/328 |
| 2023/0239080 A1* | 7/2023 | Marinier | H04L 1/189 |
| | | | 714/748 |
| 2024/0089026 A1* | 3/2024 | Bhamri | H04W 72/00 |

OTHER PUBLICATIONS

3GPP, "3rd Generation Partnership Project; Technical Specification Group Radio Access Network; NR; Multiplexing and channel coding (Release 16)," 3GPP TS 38.212 V16.6.0, Jun. 2021. (153 pages).

3GPP, "3rd Generation Partnership Project; Technical Specification Group Radio Access Network; NR; NR and NG-RAN Overall Description; Stage 2 (Release 15)," 3GPP TS 38.300 V15.6.0, Jun. 2019. (99 pages).

3GPP, "3rd Generation Partnership Project; Technical Specification Group Radio Access Network; NR; Physical channels and modulation (Release 15)," 3GPP TS 38.211 V15.6.0, Jun. 2019. (97 pages).

3GPP, "3rd Generation Partnership Project; Technical Specification Group Radio Access Network; NR; Physical channels and modulation (Release 16)," 3GPP TS 38.211 V16.6.0, Jun. 2021. (134 pages).

3GPP, "3rd Generation Partnership Project; Technical Specification Group Radio Access Network; NR; Physical layer procedures for data (Release 16)," 3GPP TS 38.214 V16.6.0, Jun. 2021. (172 pages).

3GPP, "3rd Generation Partnership Project; Technical Specification Group Radio Access Network; NR; Radio Resource Control (RRC) protocol specification (Release 16)," 3GPP TS 38.331 V16.5.0, Jun. 2021. (959 pages).

3GPP, "3rd Generation Partnership Project; Technical Specification Group Radio Access Network; Study on Scenarios and Requirements for Next Generation Access Technologies; (Release 16)," 3GPP TR 38.913 v16.0.0, Jul. 2020. (40 pages).

3GPP, "3rd Generation Partnership Project; Technical Specification Group Services and System Aspects; System Architecture for the 5G System; Stage 2 (Release 16)," 3GPP TS 23.501 V16.1.0, Jun. 2019. (367 pages).

3GPP, 3rd Generation Partnership Project; Technical Specification Group Radio Access Network; NR; Physical layer procedures for control (Release 16), 3GPP TS 38.213 V16.6.0, Jun. 2021. (187 pages).

China Telecom, "New WID on NR coverage enhancements," RP-202928, Agenda Item: 9.1.1, 3GPP TSG RAN meeting #90e, Electronic Meeting, Dec. 7-11, 2020. (5 pages).

International Search Report, mailed Aug. 9, 2022, for PCT Patent Application No. PCT/JP2022/019560. (4 pages) (with English translation).

International Telecommunication Union (Itu), "IMT Vision—Framework and overall objectives of the future development of IMT for 2020 and beyond," Radiocommunication Sector of the ITU (ITU-R), M.2083-0, Geneva, Sep. 2015. (21 pages).

Extended European Search Report dated Sep. 20, 2024, for the corresponding European Patent Application No. 22852621.6, 12 pages.

Vivo, "Remaining issues on UL data transmission procedure," R1-1803838, Agenda Item: 7.1.3.3.4, 3GPP TSG RAN WG1 Meeting #92bis, Sanya, China, Apr. 16-20, 2018, 5 pages.

* cited by examiner

100

200

TERMINAL, BASE STATION, AND COMMUNICATION METHOD WITH REPETITION TRANSMISSION CONTINUATION OR TERMINATION BASED ON A DETERMINED CONDITION

TECHNICAL FIELD

The present disclosure relates to a terminal, a base station, and a communication method.

BACKGROUND ART

In recent years, a dramatic growth of Internet of Things (IoT) has been expected with the expansion and diversification of radio services as a background. The usage of mobile communication is expanding to all fields such as automobiles, houses, home electric appliances, or industrial equipment in addition to information terminals such as smart phones. In order to support the diversification of services, a substantial improvement in the performance and function of mobile communication systems has been required for various requirements such as an increase in the number of connected devices or low latency in addition to an increase in system capacity. The 5th generation mobile communication systems (5G) has features such as enhanced mobile broadband (eMBB), massive machine type communication (mMTC), and ultra reliable and low latency communication (URLLC), and can flexibly provide radio communication in response to a wide variety of needs.

The 3rd Generation Partnership Project (3GPP) as an international standardizing body has been specifying New Radio (NR) as one of 5G radio interfaces.

CITATION LIST

Non-Patent Literature

NPL 1
  3GPP TS38.104 V15.14.0, "NR Base Station (BS) radio transmission and reception (Release 15)," June 2021.
NPL 2
  RP-202928, "New WID on NR coverage enhancements," China Telecom, December 2020.
NPL 3
  3GPP TS38.211 V16.6.0, "NR Physical channels and modulation (Release 16)," June 2021.
NPL 4
  3GPP TS38.212 V16.6.0, "NR Multiplexing and channel coding (Release 16)," June 2021.
NPL 5
  3GPP TS38.213 V16.6.0, "NR Physical layer procedures for control (Release 16)," June 2021.
NPL 6
  3GPP TS38.214 V16.6.0, "NR Physical layer procedures for data (Release 16)," June 2021.
NPL 7
  3GPP TS38.331 V16.5.0, "NR Radio Resource Control (RRC) protocol specification (Release 16)," June 2021.

SUMMARY OF INVENTION

Technical Problem

However, there is scope for further study on a method of improving the communication efficiency in uplink.

One non-limiting and exemplary embodiment of the present disclosure facilitates providing a terminal, a base station, and a communication method each capable of improving the communication efficiency in uplink.

A terminal according to an exemplary embodiment of the present disclosure includes: transmission circuitry, which, in operation, performs repetition transmission of a signal; and control circuitry, which, in operation, determines, in a case where a portion of the repetition transmission is not performed, either continuation of the repetition transmission or termination of the repetition transmission, based on whether a determination condition is satisfied.

It should be noted that general or specific embodiments may be implemented as a system, a method, an integrated circuit, a computer program, a storage medium, or any selective combination thereof.

According to an exemplary embodiment of the present disclosure, it is possible to improve the communication efficiency in uplink.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Figure 1:
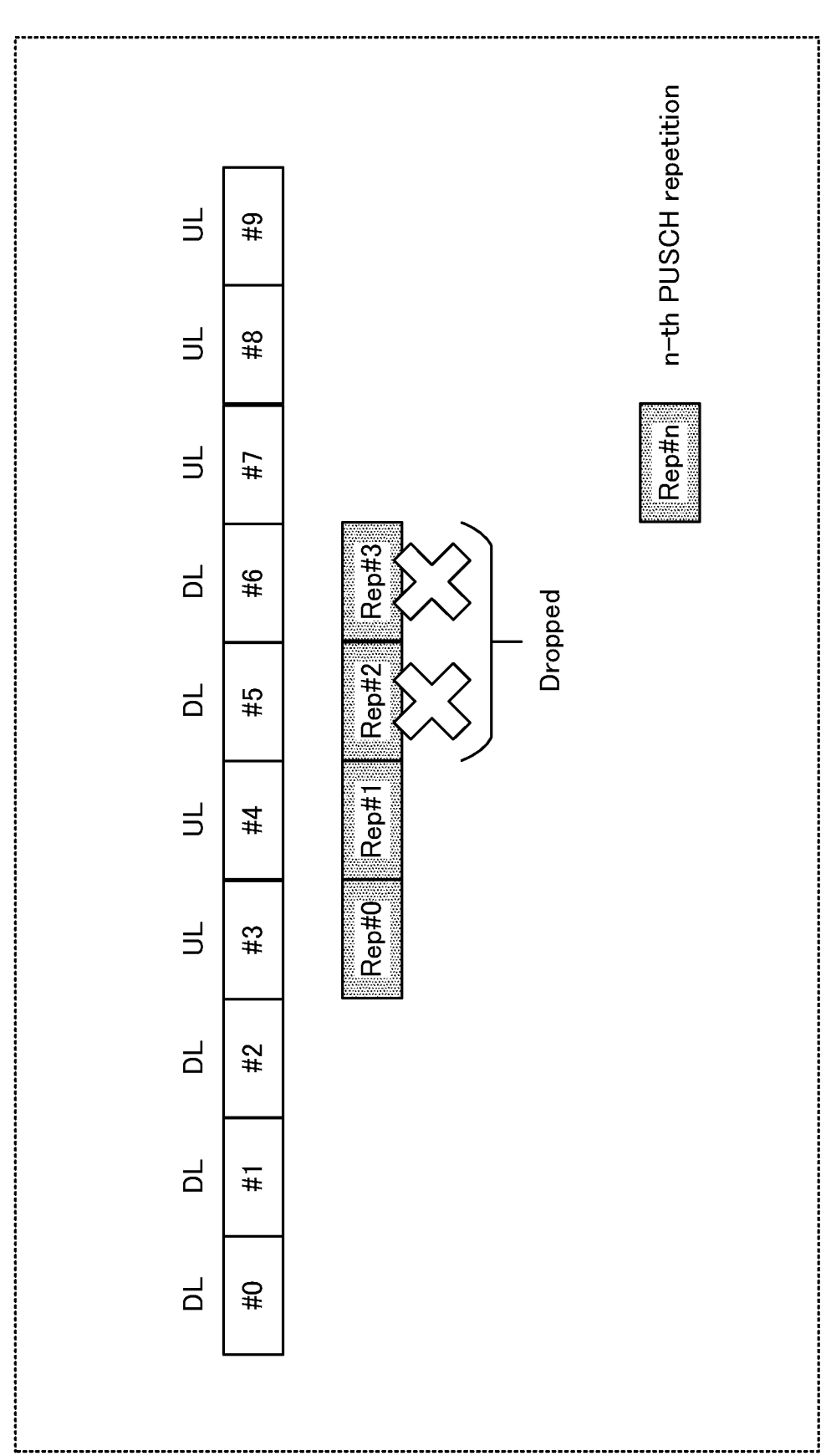
FIG. 1 illustrates an example of Physical Uplink Shared Channel (PUSCH) repetition Type A with continuous slot counting.

Hereinafter, embodiments of the present disclosure will be described in detail with reference to the accompanying drawings.

In NR, for example, in addition to a frequency band of 6 GHz or less, mainly within 700 MHz to 3.5 GHz band (e.g., may be referred to as Frequency Range 1 (FR1)), which has been used for cellular communication, a millimeter-wave band such as 28 GHz or 39 GHz band capable of ensuring a wide band (e.g., may be referred to as FR2) can be utilized (e.g., see Non-Patent Literature (hereinafter referred to as "NPL") 1). Further, for example, in FR1, a high frequency band is possibly used compared with the frequency band used in Long Term Evolution (LTE) or 3rd Generation mobile communication systems (3G) such as 3.5 GHz band.

The higher the frequency band is, the greater a radio wave propagation loss is, and thus, the received quality of radio waves is likely to deteriorate. Hence, in NR, for example, it is expected to ensure almost the same communication area (or coverage) as in the Radio Access Technology (RAT) such LTE or 3G, in other words, to ensure an appropriate communication quality when the high frequency band is used compared with LTE or 3G. In one example, in Release 17 (e.g., referred to as "Rel. 17"), a method of improving the coverage in NR has been studied (e.g., see NPL 2).

In NR, for example, a terminal (also referred to as, e.g., User Equipment (UE)) transmits and receives data in accordance with resource allocation (e.g., Grant) indicated by a downlink control signal (Downlink Control Information (DCI)) in a physical layer (layer 1) transmitted via a downlink control channel (Physical Downlink Control Channel (PDCCH)) from a base station (also referred to as, e.g., gNB) (e.g., see NPLs 3 to 6).

For example, uplink in NR supports not only "Grant-based transmission (or Dynamic grant transmission)" in which the terminal transmits an uplink data channel (Physical Uplink Shared Channel (PUSCH)) in accordance with Grant, which is data allocation information indicated by a DCI on PDCCH from the base station, but also "Grant-free transmission (or Configured grant transmission)" in which the terminal transmits PUSCH with a resource designated in advance without the Grant by the DCI (see, e.g., NPLs 3 to 6). For the Grant-free transmission, two types of methods (e.g., Type 1 and Type 2) are specified depending on a resources designation method. In Type 1, for example, all transmission parameters, such as a transmission resource periodicity, a time resource, and a frequency resource, are configured in advance by RRC that is layer 3, and, after the configuration, the terminal may start uplink data transmission without the Grant. Meanwhile, in Type 2, for example, in addition to the pre-configuration by RRC, designation of some of the parameters, such as the time resource and the frequency resource, can be semi-persistently changed by an Activation DCI transmitted via PDCCH.

Uplink transmission in NR supports a method in which the same information is transmitted multiple times (also referred to as Repetition). For example, in NR Rel. 15, slot-by-slot Repetition that is also called "PUSCH repetition Type A" is specified. Meanwhile, in NR Rel. 16, Repetition that is also called "PUSCH repetition Type B" and allows transmission of a plurality of PUSCHs in one slot is specified. For example, the PUSCH repetition Type B can achieve low latency as compared with the PUSCH repetition Type A.

In the PUSCH repetition Type A, the same time-resource allocation is applied over multiple consecutive (continuous) slots, for example. In the PUSCH repetition Type A, a base station indicates, to a terminal, the time-resource allocation in a slot and the number of slots for repetition (hereinafter referred to as repetition slots), for example. Here, the number of repetition slots may be, for example, a value that is counted based on consecutive slots.

In the PUSCH repetition Type B, a base station may indicate, to a terminal, a time-domain resource for a first (initial) PUSCH transmission and the number of repetitions, for example. In time-domain resource allocation for the second and subsequent PUSCH transmissions, symbols may be assigned, which are consecutive to and in number identical to the previous PUSCH transmission, for example.

In the PUSCH repetition Type A, the number of repetition slots to be indicated is a value counted based on consecutive slots; hence, the number of slots for actually transmitting PUSCH may be less than the number of indicated repetition slots.

For example, as illustrated in FIG. 1, in Time Division Duplex (TDD), let us assume a case where Repetition for Configured grant PUSCH transmission is configured, slot #3 is indicated as a timing to start the Repetition, and four repetition slots are indicated. In this case, when a downlink (DL) slot is included in the consecutive repetition slots (slots #3, #4, #5, and #6), no PUSCH is transmitted in this downlink slot (e.g., PUSCH transmission is dropped). Transmission of no PUSCH may deteriorate the PUSCH coverage performance in the PUSCH repetition Type A.

Therefore, in NR Rel. 17, as a function extension of the PUSCH repetition Type A, for example, it has been studied to make the number of repetition slots a value that is counted based on an uplink slot that can be used (available) for PUSCH transmission.

Figure 2:
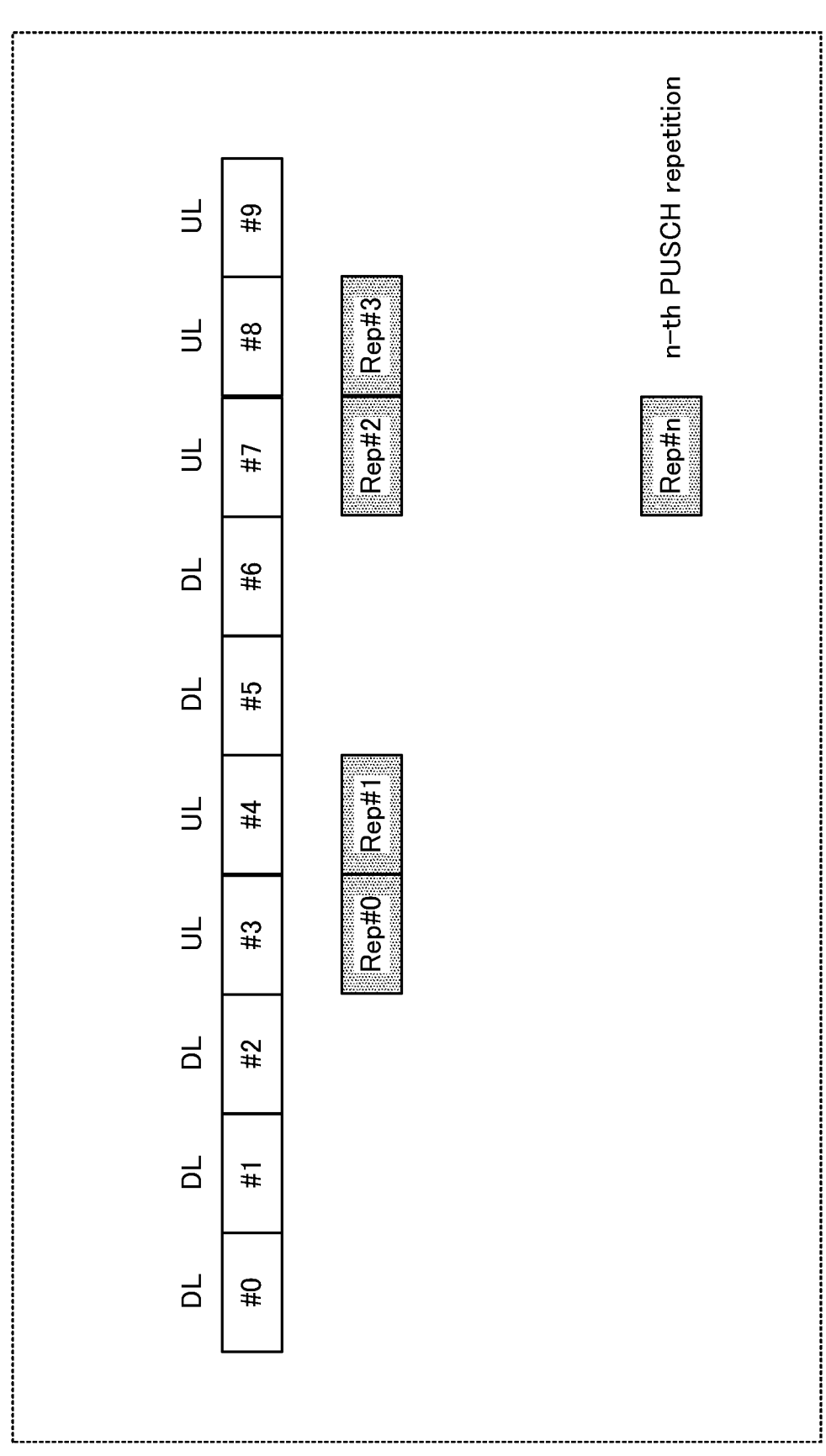
FIG. 2 illustrates an example of PUSCH repetition Type A with available slot counting.

FIG. 2 illustrates an exemplary case where slot #3 is indicated as a timing to start Repetition, four repetition slots are indicated, and uplink slots available for PUSCH transmission are slots #3, #4, #7, #8, and #9. Hereinafter, this Repetition scheme is referred to as "PUSCH repetition Type A with available slot counting." Meanwhile, the Repetition scheme in which the number of slots is counted based on consecutive slots as illustrated in FIG. 1 is referred to as "PUSCH repetition Type A with continuous slot counting." The PUSCH repetition Type with available slot counting enables PUSCH transmission as many times as the number of indicated repetition slots, which brings about expectations of improvement in the PUSCH coverage performance, as compared with the PUSCH repetition Type A with continuous slot counting.

As mentioned above, in the PUSCH repetition Type A with available slot counting, the number of repetition slots is counted based on an uplink slot available for PUSCH transmission. Here, a method of determining an uplink slot available for PUSCH transmission may depend on, for example, a slot-format indication configured in advance by RRC (e.g., semi-static Slot Format Indication (SFI)) and information on time-resource allocation for the PUSCH transmission.

In this case, the terminal may determine whether to actually transmit PUSCH in the uplink slot available for the PUSCH transmission, based on a dynamic indication. For example, the dynamic indication may include a dynamic SFI indication (dynamic SFI), uplink-transmission-cancellation indication (Uplink Link Cancellation Indication (UL CI)), and allocation of high-priority uplink transmission.

Figure 3:
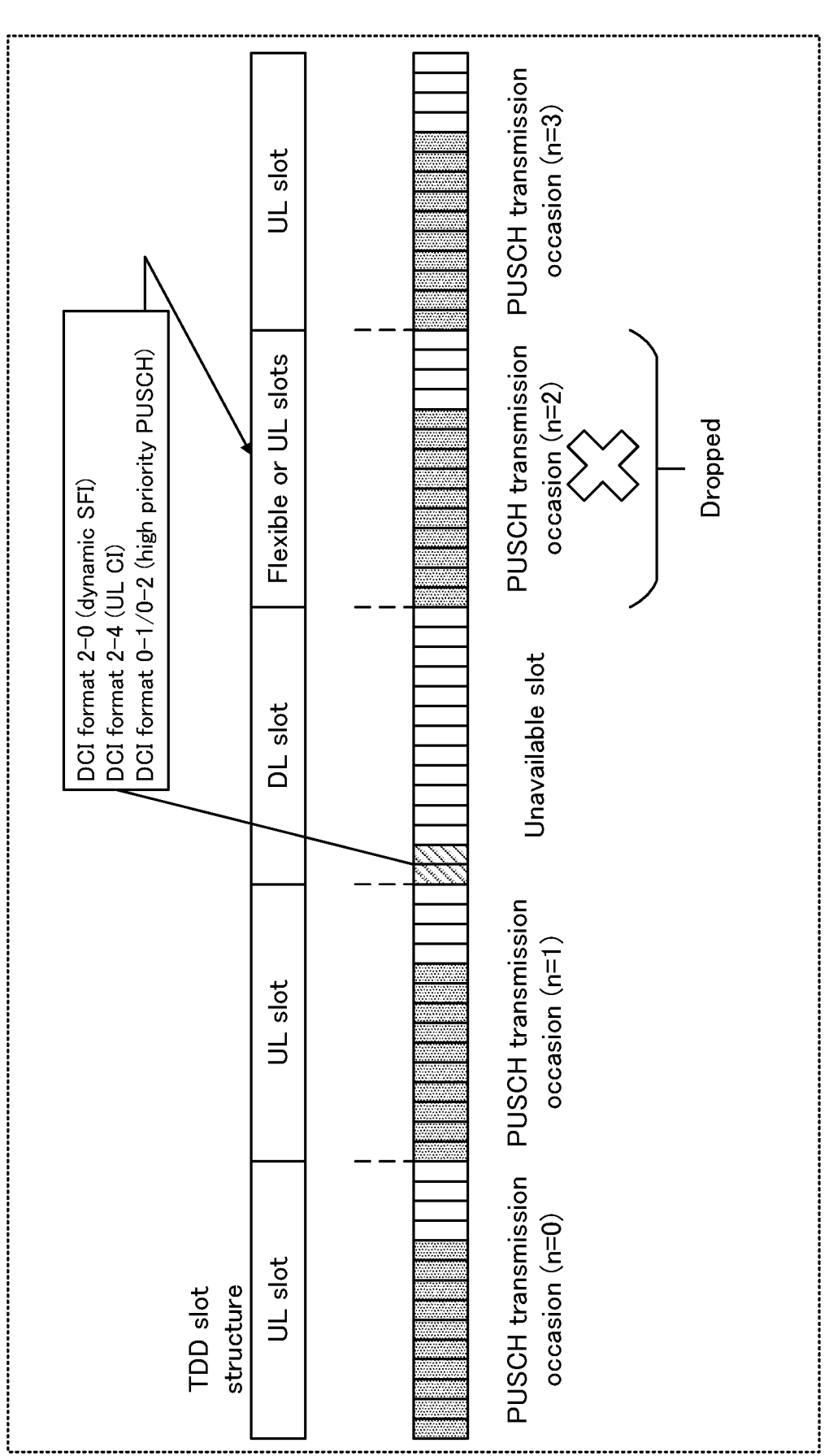
FIG. 3 illustrates an example of dropping of PUSCH transmission in the PUSCH repetition Type A with available slot counting.

For example, even when the terminal transmits no PUSCH in an uplink slot available for PUSCH transmission based on the dynamic indication, the slot may be counted as the number of repetition slots. Thus, even in the PUSCH repetition Type A with available slot counting, in an uplink slot available for PUSCH transmission, PUSCH may not be transmitted (i.e., PUSCH transmission may be dropped) in a certain slot by the dynamic indication (e.g., dynamic SFI, UL CI, or high-priority PUSCH), as illustrated in FIG. 3, for example. For this reason, even in the PUSCH repetition Type A with available slot counting, the number of slots for actually transmitting PUSCH may be less than the number of indicated repetition slots.

Here, in the Configured grant transmission, when a terminal has no transmission data, the terminal need not transmit PUSCH with a resource for the Configured grant transmission configured in advance. For example, a base station may detect the presence or absence of transmission (hereinafter may also be referred to as "transmission presence/absence") in the Configured grant transmission by the terminal. As an example of the detection of the transmission presence/absence in the Configured grant transmission, the base station may monitor a received power in a resource for the Configured grant transmission configured in advance on the terminal so as to determine, when the received power is equal to or greater than a threshold, that the terminal has performed transmission in the Configured grant transmission, and thus perform decoding on the Configured grant transmission.

For example, in order to determine the transmission presence/absence in the Configured grant transmission to which Repetition is applied, the base station may monitor resources for the Configured grant transmission configured in advance on the terminal, for a specified number of slots or Repetitions. For example, one implementation of the base station for the detection of the transmission presence/absence in the Configured grant transmission is correlation detection of a Demodulation Reference Signal (DMRS). The base station may, for example, accumulate outputs of DMRS symbols or the DMRS correlation detection of a slot in which PUSCH is transmittable, and, when an accumulation value is equal to or greater than a threshold, determine that the terminal has performed transmission in the Configured grant transmission.

As described above, in the PUSCH repetition Type A, the number of slots for actually transmitting PUSCH may be less than the number of indicated repetition slots regardless of the PUSCH repetition Type A with continuous slot counting and the PUSCH repetition Type A with available slot counting. At this time, when the number of slots in which a terminal actually transmits PUSCH is less than the number of slots used by a base station for determining the transmission presence/absence in the Configured grant transmission, the base station may not detect the transmission presence/absence in the Configured grant transmission to which Repetition is applied. In a situation where the base station cannot detect the transmission presence/absence in the Configured grant transmission with Repetition applied, the base station may incorrectly determine that no transmission is performed in the Configured grant transmission even though the terminal has performed the transmission in the Configured grant transmission. Such Configured grant transmission that is not detected by the base station may cause, for example, an unnecessary occupation of uplink resources or an unnecessary increase in power consumption of the terminal, which may reduce communication efficiency in uplink.

In one non-limiting and exemplary embodiment of the present disclosure, a description will be given of how to improve the communication efficiency in uplink when a terminal performs Repetition transmission of PUSCH in the Configured grant transmission.

By way of example, in Repetition transmission for the Configured grant PUSCH transmission, some PUSCHs may not be transmitted (e.g., PUSCH transmissions may be dropped), and thus, the number of slots for actually transmitting PUSCH may be less than the number of indicated repetition slots. For example, when a terminal does not perform Repetition transmission corresponding to the number of slots or Repetitions used by a base station for determining the transmission presence/absence in the Configured grant transmission, the terminal may cease the Repetition transmission (i.e., may terminate, halt, or stop transmission). This makes it possible, for example, to suppress transmission in an unnecessary Configured grant transmission that is not detected by the base station, thereby improving the utilization efficiency of uplink resources or reducing the power consumption of the terminal.

In the following, some embodiments will be described.

[Overview of Communication System]

A communication system according to each embodiment of the present disclosure includes, for example, at least one base station and at least one terminal.

Figure 4:
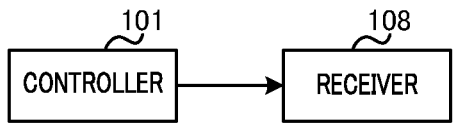
FIG. 4 is a block diagram illustrating an exemplary configuration focused on part of a base station.
Figure 5:
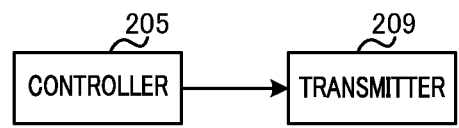
FIG. 5 is a block diagram illustrating an exemplary configuration focused on part of a terminal.

FIG. 4 is a block diagram illustrating an exemplary configuration focused on part of base station 100 according to an exemplary embodiment of the present disclosure, and FIG. 5 is a block diagram illustrating an exemplary configuration focused on part of terminal 200 according to an exemplary embodiment of the present disclosure.

In base station 100 illustrated in FIG. 4, receiver 108 performs reception of a repeated transmission (Repetition transmission) of a signal. When a portion of the repetition transmission is not performed, controller 101 determines either to continue the repetition transmission or to terminate (or cease) the repetition transmission, based on whether a determination condition is satisfied.

In terminal 200 illustrated in FIG. 5, transmitter 209 (corresponding to transmission circuitry) performs repetition transmission (Repetition transmission) of a signal. When a portion of the repetition transmission is not performed (e.g., dropped), controller 205 determines either to continue the repetition transmission or to terminate (or cease) the repetition transmission, based on whether a determination condition is satisfied.

Embodiment 1

[Configuration of Base Station]

Figure 6:
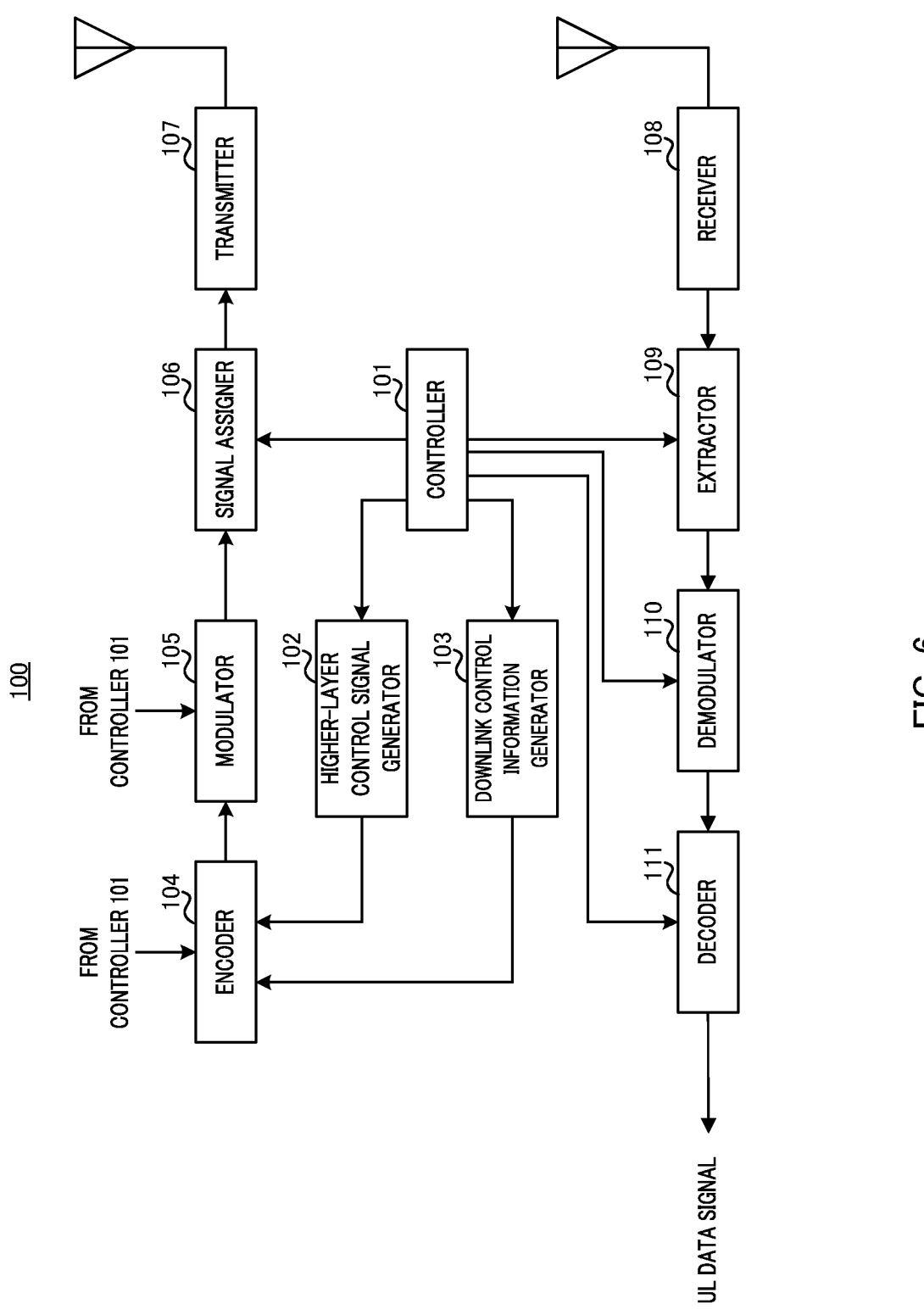
FIG. 6 is a block diagram illustrating an exemplary configuration of the base station.

FIG. 6 is a block diagram illustrating an exemplary configuration of base station 100. The exemplary configuration of base station 100 illustrated in FIG. 6 may be common throughout the present disclosure including other embodiments and variations to be described later.

As illustrated in FIG. 6, base station 100 may include, for example, controller 101, higher-layer control signal generator 102, downlink control information generator 103, encoder 104, modulator 105, signal assigner 106, and transmitter 107. Base station 100 may further include, for example, receiver 108, extractor 109, demodulator 110, and decoder 111.

Controller 101, for example, determines information on PUSCH transmission to terminal 200 and outputs the determined information to higher-layer control signal generator 102. The information on the PUSCH transmission may include at least one of configuration information on Configured grant PUSCH transmission (e.g., configuredGrant-Config), information on a Time Domain Resource Allocation (TDRA) table, and information on the number of Repetitions. The information on the PUSCH transmission may further include information on a parameter (e.g., threshold N, M, or $P_{max}$) for a determination condition on continuation or termination of Repetition transmission to be described later.

Controller 101 also determines, for example, a coding/modulation scheme and radio resource allocation for a higher-layer control signal and a downlink signal that is for transmitting downlink control information. Controller 101 may output the determined information to encoder 104, modulator 105, and signal assigner 106, for example. Further, controller 101 may output the coding/modulation scheme and the information on the radio resource allocation for the higher-layer control signal to downlink control information generator 103, for example.

Controller 101 also determines, for example, a coding/modulation scheme and radio resource allocation with which terminal 200 transmits an uplink data signal and then outputs the determined information to downlink control information generator 103, extractor 109, demodulator 110, and decoder 111.

Further, controller 101 may specify a resource for PUSCH repetition transmission based on a method to be described later, for example, and output the specified information to extractor 109, demodulator 110, and decoder 111.

Higher-layer control signal generator 102 generates, for example, a higher-layer control signal (e.g., bit sequence (or bit string)) by using the control information input from controller 101. Higher-layer control signal generator 102 may output the generated signal to encoder 104, for example.

Downlink control information generator 103 generates, for example, a DCI (e.g., bit sequence) by using the control information input from controller 101 and then outputs the generated DCI to encoder 104. Note that the control information may be transmitted to a plurality of terminals 200.

Encoder 104 encodes, based on the control information input from controller 101, the bit sequence input from higher-layer control signal generator 102 or the DCI input from downlink control information generator 103 and then outputs the encoded bit sequence to modulator 105, for example.

Modulator 105 modulates, based on the control information input from controller 101, the encoded bit sequence input from encoder 104 and outputs the modulated bit sequence to signal assigner 106, for example.

Signal assigner 106 maps, to a radio resource indicated by controller 101, the control signal input from modulator 105 as a symbol sequence, for example. Further, signal assigner 106 outputs the signal mapped to the radio resource to transmitter 107.

Transmitter 107 performs, for example, transmission-waveform generation processing such as Orthogonal Frequency Division Multiplexing (OFDM) on the signal output from signal assigner 106. In the case of OFDM transmission using a cyclic prefix (CP), transmitter 107 may add the CP to the signal resulting from Inverse Fast Fourier Transform (IFFT).

Further, transmitter 107 performs, for example, radio (RF) processing such as Digital-Analog (D/A) conversion and/or up-conversion on the signal output from signal assigner 106, and then outputs the resultant radio signal to terminal 200 via an antenna.

Receiver 108 performs, for example, RF processing such as down-conversion and/or Analog-Digital (A/D) conversion on an uplink signal received from terminal 200 via an antenna. Further, in the case of OFDM transmission, receiver 108 applies FFT to the received signal so as to generate a frequency-domain signal, and then outputs the resultant signal to extractor 109.

Extractor 109 extracts, from the received signal, a radio resource part with which PUSCH has been transmitted, based on the information input from controller 101, for example, and outputs the extracted signal for PUSCH to demodulator 110.

Demodulator 110 detects PUSCH based on the information input from controller 101 and demodulates PUSCH when determining that PUSCH transmission is present, thus outputting a demodulation result to decoder 111, for example.

Decoder 111, for example, performs error correction decoding on PUSCH by using the information input from controller 101 and the demodulation result input from demodulator 110 and thereby obtains a reception bit sequence (e.g., UL data signal) after the decoding.

[Configuration of Terminal]

Figure 7:
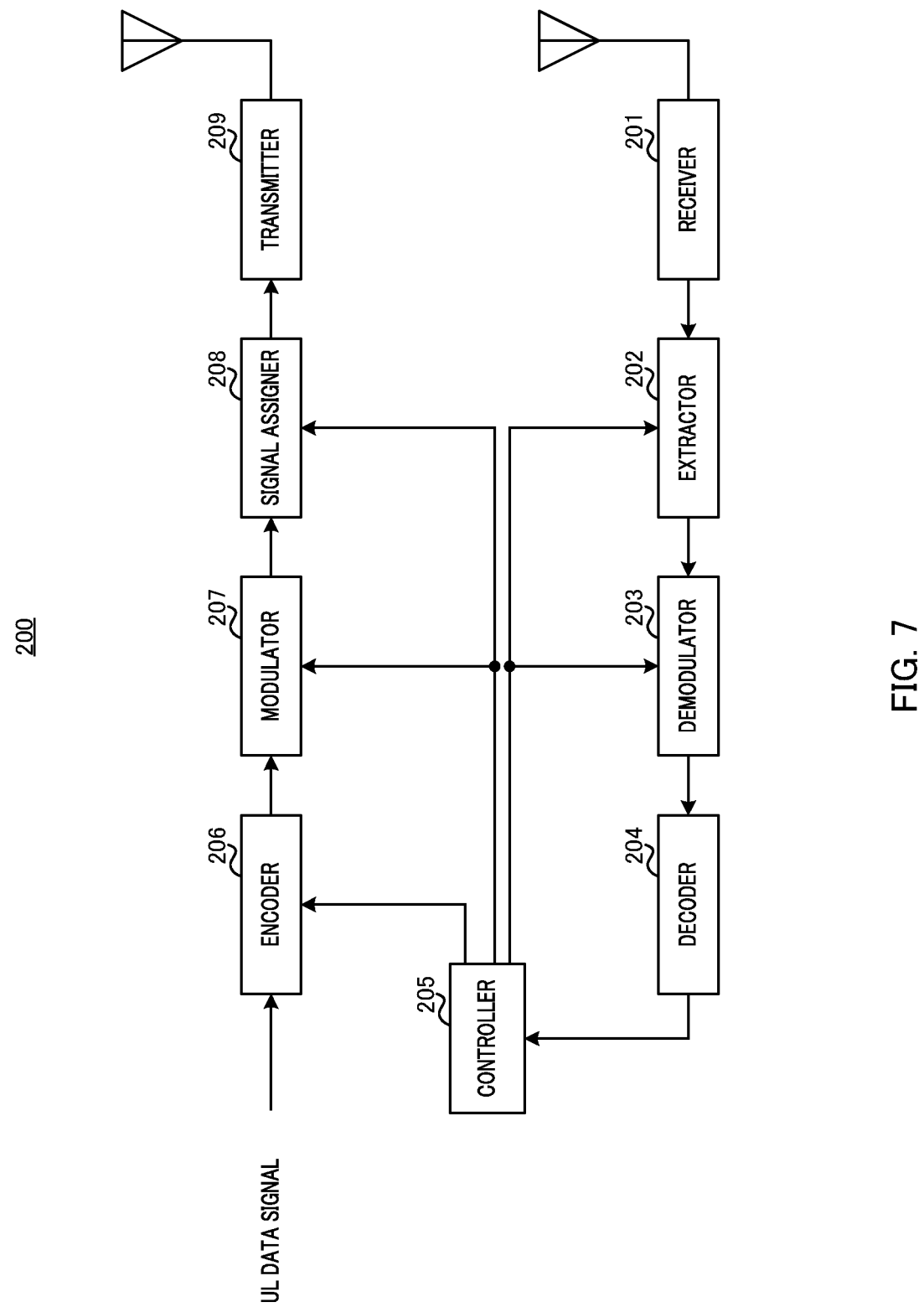
FIG. 7 is a block diagram illustrating an exemplary configuration of the terminal.

Next, an exemplary configuration of terminal 200 will be described with reference to FIG. 7. As illustrated in FIG. 7, terminal 200 may include receiver 201, extractor 202, demodulator 203, decoder 204, and controller 205. Terminal 200 may further include encoder 206, modulator 207, signal assigner 208, and transmitter 209.

Receiver 201 receives via an antenna, for example, a data signal or a downlink control signal transmitted from base station 100, performs the RF processing such as the down-conversion and/or the A/D conversion on the received radio signal, and thereby generates a baseband signal. Further, when receiving an OFDM signal, receiver 201 performs the FFT processing on the received signal to convert the received signal into that in the frequency domain.

Extractor 202, for example, extracts, from the received signal input from receiver 201, a radio resource part, which includes the downlink control signal, by using information on a radio resource for the control signal input from controller 205, and then outputs the extracted signal to demodulator 203. Further, extractor 202 extracts a radio resource part, which includes the data signal, by using information on a radio resource for the data signal input from controller 205, and then outputs the extracted signal to demodulator 203.

Demodulator 203, for example, demodulates PDCCH or PDSCH based on the information input from controller 205 and outputs a demodulation result to decoder 204.

Decoder 204, for example, performs error correction decoding on PDCCH or PDSCH by using the information input from controller 205 and the demodulation result input from demodulator 203, thereby obtaining higher-layer control information or downlink control information. Decoder 204 may output the obtained higher-layer control information and downlink control information to controller 205, for example.

Controller 205, for example, identifies (or determines) a radio resource for PUSCH transmission, based on radio-resource allocation information obtained from the higher-layer control signal and the downlink control information. Controller 205, for example, outputs the determined information to signal assigner 208, extractor 202, and demodulator 203.

Further, controller 205 may, for example, identify a resource for PUSCH repetition transmission based on a method to be described later, for example, and output the identified information to encoder 206, modulator 207, and signal assigner 208.

Encoder 206 encodes an uplink data signal, based on the information input from controller 205, and outputs the encoded bit sequence to modulator 207, for example.

Modulator 207 modulates, based on the information input from controller 205, the encoded bit sequence input from encoder 206 to generate a modulated symbol sequence, and outputs the modulated symbol sequence to signal assigner 208, for example.

Signal assigner 208 maps, to a radio resource indicated by controller 205, the signal input from modulator 207, for example. Further, signal assigner 208 outputs the signal mapped to the radio resource to transmitter 209.

Transmitter 209, for example, performs transmission signal-waveform generation such as OFDM on the signal input from signal assigner 208. In addition, in the case of OFDM transmission using the CP, for example, transmitter 209 may add the CP to the signal after the IFFT. Alternatively, when a single-carrier waveform is generated, a Discrete Fourier Transformer (DFT) may be provided at a rear stage of modulator 207 or a front stage of signal assigner 208.

Further, transmitter 209 performs, for example, the RF processing such as the D/A conversion and/or the up-conversion on the transmission signal, and then outputs the resultant radio signal via an antenna.

[Exemplary Operation of Terminal 200]

An exemplary operation of terminal 200 having the above configuration will be described.

In the present embodiment, for example, in Repetition transmission for Configured grant PUSCH transmission, terminal 200 may determine, when a slot in which no PUSCH transmission is performed (e.g., slot in which PUSCH transmission is dropped) is present, either to continue the Repetition transmission in slots after this slot or to cease the Repetition transmission (e.g., to stop transmission) after this slot.

For example, a threshold N may be used as a determination rule (i.e., determination condition) by which either continuation of the Repetition transmission or cessation (or termination) of the Repetition transmission is determined. The threshold N may be, for example, a threshold relating to the number of times of transmission of a signal subject to the Repetition transmission.

For example, in Repetition transmission for the Configured grant transmission, terminal 200 may determine to continue the Repetition transmission in a case where the sum of the number of times (or the number of slots in which) PUSCH has been actually transmitted in slots positioned before a slot in which no PUSCH is transmitted and the number of slots in which PUSCH can be transmitted (e.g., uplink slots available for PUSCH transmission) after the slot in which no PUSCH is transmitted is equal to or greater than the threshold N.

On the other hand, for example, in Repetition transmission for the Configured grant transmission, in a case where the sum of the number of times (or the number of slots in which) PUSCH has been actually transmitted in slots positioned before a slot in which no PUSCH is transmitted and the number of slots in which PUSCH can be transmitted (e.g., the number of uplink slots available for PUSCH transmission) after the slot in which no PUSCH is transmitted is less than the threshold N, terminal 200 may determine to cease the Repetition transmission (to terminate transmission) after the slot in which no PUSCH is transmitted.

For example, the threshold N may be set based on the number of slots used by base station 100 for determining the transmission presence/absence in the Configured grant transmission (e.g., the number of slots required for determination). Thus, for example, when terminal 200 does not transmit PUSCH repetition N times or more, terminal 200 ceases the Repetition transmission (e.g., terminates transmission). This makes it possible to suppress transmission of an unnecessary Configured grant transmission that is not detected in base station 100. Suppressing the transmission of the unnecessary Configured grant transmission can reduce the power consumption of terminal 200, for example. Therefore, according to the present embodiment, the utilization efficiency of uplink resources can be improved.

Figure 8:
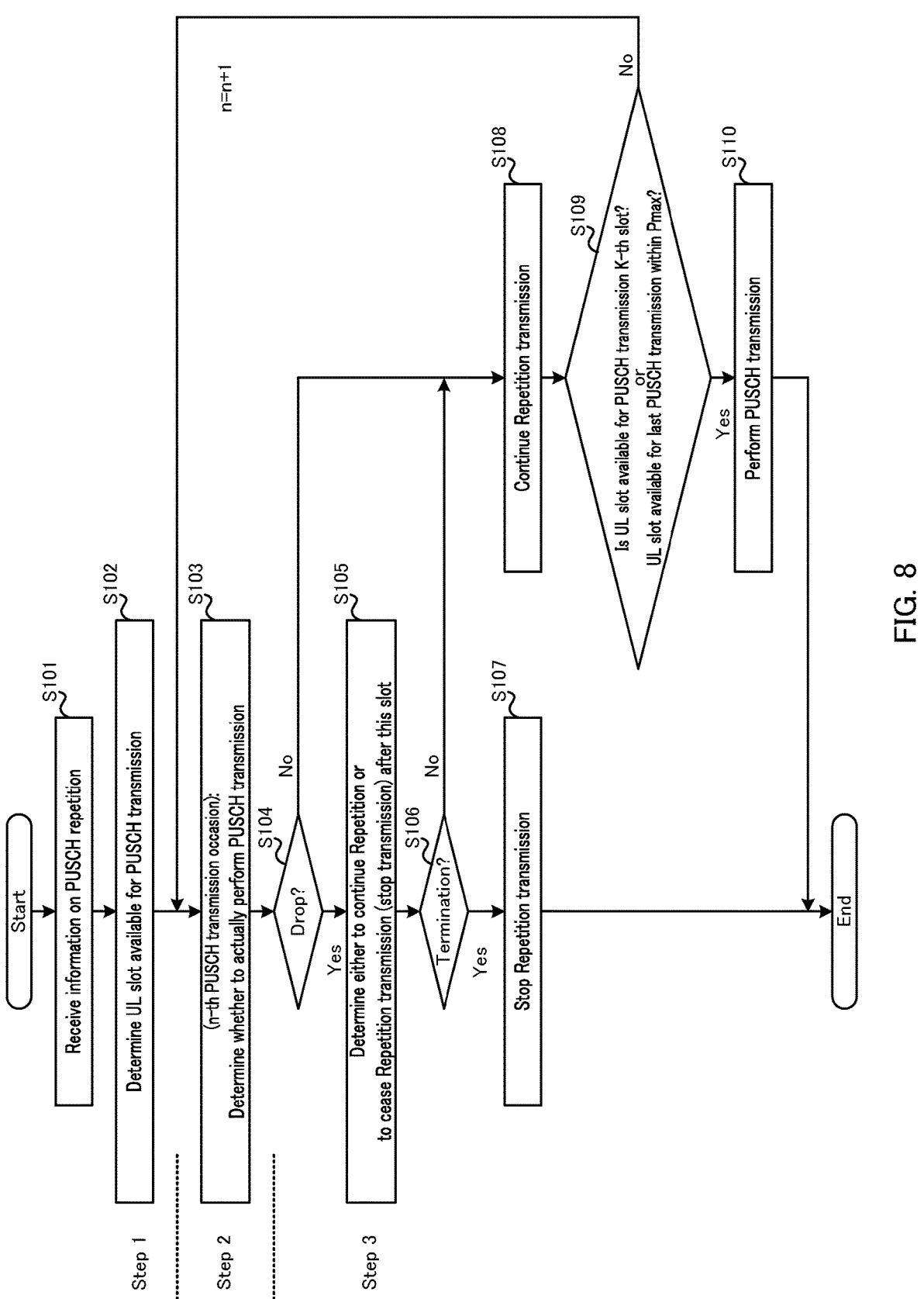
FIG. 8 is a flowchart describing an exemplary operation according to Embodiment 1.

FIG. 8 is a flowchart describing an exemplary operation of terminal 200.

As illustrated in FIG. 8, terminal 200 receives information on PUSCH repetition, for example (S101). The information on the PUSCH repetition may include, for example, information on time-resource allocation in a slot used for Repetition transmission and information on the number of repetition slots, K.

<Step 1>

Terminal 200 determines an uplink slot available for PUSCH transmission based on the information on the PUSCH repetition, for example (S102).

For example, in the case of PUSCH repetition Type A with continuous slot counting, the number of repetition slots, K, is a value counted based on consecutive slots. In the PUSCH repetition Type A with continuous slot counting, terminal 200 may configure the consecutive K slots to uplink slots available for the PUSCH transmission, for example.

Meanwhile, in the case of PUSCH repetition Type A with available slot counting, the number of repetition slots, K, is a value counted based on an uplink slot available for PUSCH transmission. In the PUSCH repetition Type A with available slot counting, for example, terminal 200 may determine the uplink slot available for the PUSCH transmission, based on SFI indication configured in advance by RRC and information on time-resource allocation in a slot for the PUSCH transmission. By way of example, in a certain slot, when time-resource allocation in the slot for PUSCH transmission collides with a downlink symbol configured in advance by RRC, terminal 200 need not include this slot in the uplink slot available for the PUSCH transmission.

Incidentally, the information on the time-resource allocation in the slot for the PUSCH transmission may be included in RRC, which had configuration relating to the Configured grant transmission (e.g., configuredGrantConfig (see NPL 7)), and then indicated to terminal 200, or may be included in time-domain resource allocation (TDRA) included in an Activation DCI and then indicated to terminal 200, for example.

<Step 2>

In FIG. 8, terminal 200 determines whether to actually transmit PUSCH in the uplink slot available for the PUSCH transmission determined in Step 1 (e.g., the n-th PUCCH transmission occasion) (S103). Note that terminal 200 may count, as the number of repetition slots, a slot for which it has been determined to perform no PUSCH transmission (to drop PUSCH transmission) in Step 2.

In the case of PUSCH repetition Type A with continuous slot counting, for example, terminal 200 may determine to transmit no PUSCH (to drop PUSCH transmission) in a certain slot in the following case where: time-resource allocation in the slot for the PUSCH transmission collides with a downlink symbol configured in advance by RRC; the time-resource allocation in the slot for the PUSCH transmission collides with a downlink symbol configured by a dynamic SFI indication (dynamic SFI); the time-resource allocation in the slot for the PUSCH transmission collides with a resource indicated by uplink-transmission-cancellation indication (UL CI); or the time-resource allocation in the slot for the PUSCH transmission collides with allocation of high-priority uplink transmission.

Meanwhile, in the case of PUSCH repetition Type A with available slot counting, terminal 200 may determine to transmit no PUSCH (to drop PUSCH transmission) in a certain slot in the following case where: time-resource allocation in the slot for the PUSCH transmission collides with a downlink symbol configured by a dynamic SFI indication (dynamic SFI); the time-resource allocation in the slot for the PUSCH transmission collides with a resource indicated by uplink-transmission-cancellation indication (UL CI); or the time-resource allocation in the slot for the PUSCH transmission collides with allocation of high-priority uplink transmission.

<Step 3>

When determining to transmit no PUSCH (to drop PUSCH transmission) in Step 2 (S104: Yes), terminal 200 may determine either to continue the Repetition transmission in slots positioned after the slot or to cease the Repetition transmission (stop transmission) after the slot, based on the above-mentioned methods (e.g., determination method using threshold N) (S105).

For example, in FIG. 8, when determining to transmit no PUSCH (drop PUSCH transmission) in Step 2 (S104: Yes) and determining to cease the Repetition transmission (S106: Yes), terminal 200 ceases the Repetition transmission (terminates Repetition transmission) in slots positioned after the slot (S107).

On the other hand, when determining to transmit PUSCH in Step 2 (S104: No) or determining to continue the Repetition transmission (S106: No), terminal 200 continues the Repetition transmission in slots positioned after the slot (S108).

For example, in FIG. 8, when continuing the Repetition transmission, terminal 200 determines whether an uplink slot available for the PUSCH transmission is the K-th slot (S109). In a case where the uplink slot available for the PUSCH transmission is the K-th slot (S109: Yes), terminal 200 transmits PUSCH (S110). On the other hand, in a case where the uplink slot available for the PUSCH transmission is not the K-th slot (S109: No), terminal 200 performs processing of Step 2 and Step 3 on another uplink slot available for the next PUSCH transmission (e.g., the n+1-st PUSCH transmission occasion).

[Setting Examples of Threshold N]

The threshold N used in Step 3 for determining the continuation or the cessation of the Repetition transmission may be a value determined (or specified) by standards or a value (parameter) indicated from base station 100 to terminal 200.

In a case where the threshold N is a value determined by standards, the value of N may be a value that does not depend on the number of Repetitions, K, for example. In one example, N may be set to two. For example, a required signal-to-noise power ratio (SNR) in DMRS correlation detection for determining the transmission presence/absence in the Configured grant transmission may be small compared with a required SNR in decoding of PUSCH transmission. Hence, the value of threshold N may be a value equal to or smaller than the number of Repetitions, K.

Alternatively, the value of N may be a different value depending on the number of Repetitions, K. For example, N may be set to one when the number of Repetitions, K, is four or less or may be set to two when the number of Repetitions, K, is more than four. The more the number of Repetitions is, the smaller the required SNR in the decoding of the PUSCH transmission is. Therefore, for example, setting a larger value of N reduces the required SNR in the DMRS correlation detection for determining the transmission presence/absence in the Configured grant transmission as the number of Repetitions increases, thus making it possible to match with the required SNR in the decoding of the PUSCH transmission.

Alternatively, the value of N may be a different value depending on, in addition to the number of Repetitions, K, the number of DMRS symbols in a slot. In one example, when the number of Repetitions, K, is four or less, N may be set to one independent of the number of DMRS symbols in the slot. On the other hand, for example, in a situation where the number of Repetitions, K, is more than four, N may be set to two when the number of DMRS symbols in the slot is one, or N may be set to one when the number of DMRS symbols in the slot is greater than one. Since the required SNR in the DMRS correlation detection for determining the transmission presence/absence in the Configured grant transmission may be small as the number of DMRS symbols in the slot increases, the value of N need not be increased.

Besides, a performance of the DMRS correlation detection for determining the transmission presence/absence in the Configured grant transmission depends on the number of DMRS symbols. Therefore, for example, the value of N may be given based on the number of DMRS symbols rather than the number of slots. For example, the value of N may be a value that depends on, in addition to the number of Repetitions, K, the sum of the number of DMRS symbols included in PUSCH actually transmitted in slots positioned before a slot in which no PUSCH is transmitted (PUSCH transmission is dropped) and the number of DMRS symbols included in PUSCH that can be transmitted after the slot. For example, when the number of Repetitions, K, is four or less, the threshold N that depends on the sum of the number of DMRS symbols is set to two symbols, whereas, when the number of Repetitions, K, is more than four, the threshold N that depends on the sum of the number of DMRS symbols is set to four symbols.

Meanwhile, in a case where the threshold N is a parameter indicated from base station 100 to terminal 200, the threshold N may be indicated from base station 100 to terminal 200 by RRC. The RRC parameter for indicating the threshold N may be indicated by being included in DMRS-Config that configures information on DMRS, in pusch-Config that configures information on PUSCH, or in RRC having the configuration relating to the configured grant transmission (e.g., configuredGrantConfig), for example (e.g., see NPL 7).

Incidentally, the threshold N may be indicated by a Medium Access Control-Control Element (MAC-CE). Further, the threshold N may be indicated by an Activation DCI. When the threshold N is indicated by the Activation DCI, the threshold N may be included in a TDRA table included in the Activation DCI or may be indicated by a specific bit field.

Further, the threshold N may be indicated from base station 100 to terminal 200 by at least one (e.g., combination of at least two) of RRC, the MAC-CE, and the Activation DCI.

The threshold N may be a value that is implicitly determined, without an explicit indication, based on indication information (another parameter) different from and other than the information on the determination rule that uses the threshold N. For example, when channel estimation of composing DMRSs of multiple slots is applied to PUSCH repetition, a slot period (time domain window) that maintains phase continuity of a transmission signal or keeps transmission power of the transmission signal constant for terminal 200 can be configured. For example, the value of threshold N may be set based on the time domain window. By way of example, the value of threshold N may be set to the same value as the time domain window.

The setting examples of the threshold N have been each described, thus far.

Figure 9:
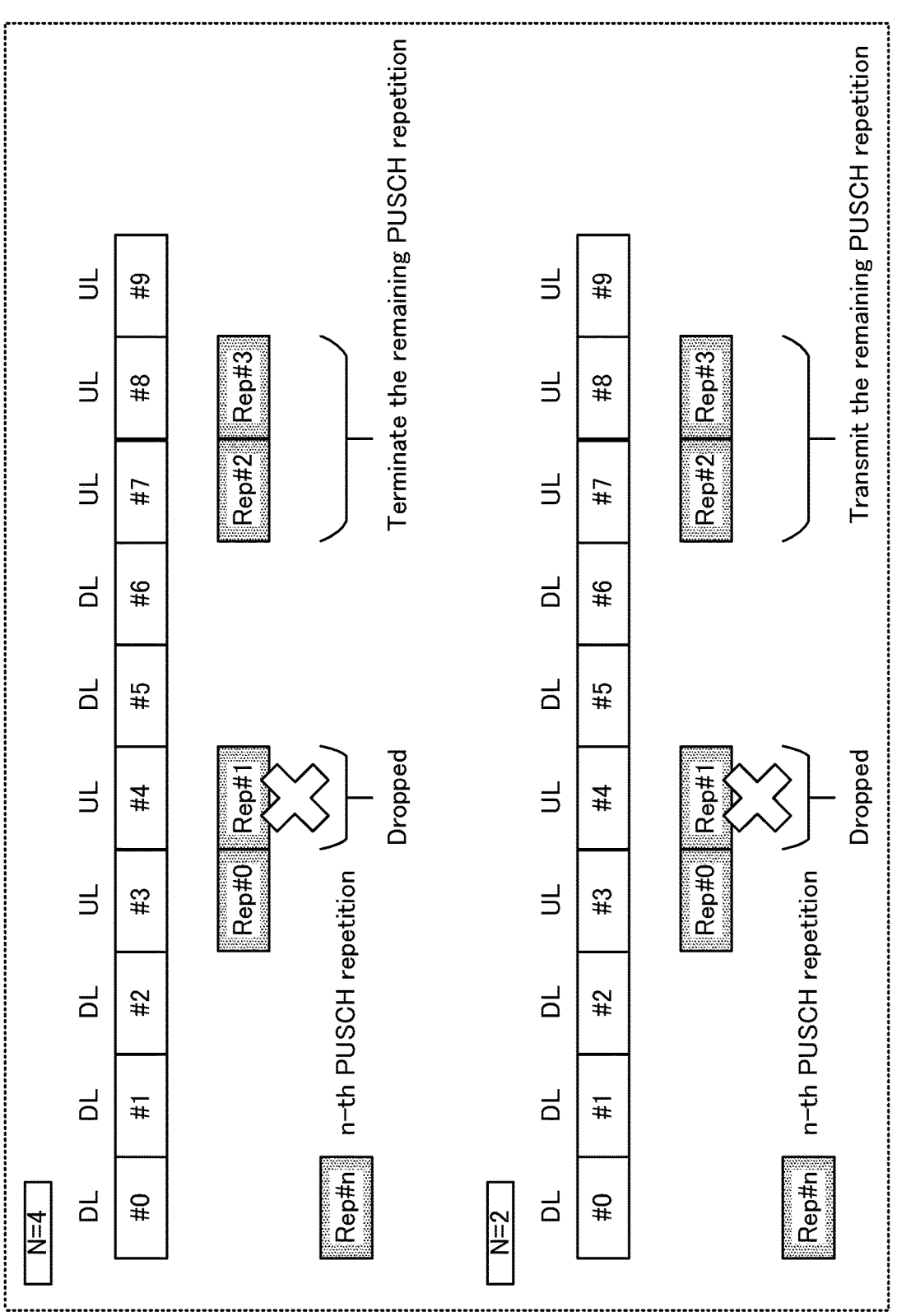
FIG. 9 illustrates another exemplary operation according to Embodiment 1.

FIG. 9 illustrates an exemplary operation of terminal 200 according to the present embodiment for PUSCH repetition Type A with available slot counting where the number of Repetitions, K, is four.

In FIG. 9, terminal 200 determines, in Step 1, slots #3, #4, #7, and #8 as uplink slots available for PUSCH transmission. Further, in FIG. 9, terminal 200 determines, in Step 2, to transmit no PUSCH (to drop PUSCH transmission) in slot #4.

For example, as illustrated in FIG. 9, in a case where the threshold N=4, the sum (three times) of the number of times PUSCH has been actually transmitted (once in slot #3) in slots positioned before slot #4 for which it has been determined to drop PUSCH transmission and the number of times PUSCH can be transmitted after slot #4 (e.g., the number of uplink slots available for PUSCH transmission; twice in slots #7 and #8) is less than the threshold N=4.

For this reason, as illustrated in FIG. 9, in a case where threshold N=4, terminal 200 determines to cease Repetition transmission (to terminate transmission) after slot #4. Thus, in a situation where base station 100 is highly unlikely to detect the transmission presence/absence in the Configured grant transmission with Repetition applied, it is possible to suppress an unnecessary occupation of uplink resources and to suppress an increase in power consumption of terminal 200 by ceasing Repetition transmission, thus improving the communication efficiency in uplink.

Further, for example, as illustrated in FIG. 9, in a case where the threshold N=2, the sum (three times) of the number of times PUSCH has been actually transmitted (once in slot #3) in slots positioned before slot #4 for which it has been determined to drop PUSCH transmission and the number of times PUSCH can be transmitted after slot #4 (twice in slots #7 and #8) is more than the threshold N=2.

Therefore, as illustrated in FIG. 9, in a case where the threshold N=2, terminal 200 determines to continue the Repetition transmission after slot #4. In this manner, in a situation where base station 100 is highly likely to detect the transmission presence/absence in the Configured grant transmission with Repetition applied, continuing the Repetition transmission makes it possible to improve the communication efficiency in uplink even when a portion of the Repetition transmission is dropped.

As described above, according to the present embodiment, terminal 200 determines, when a portion of Repetition transmission is not performed (e.g., when Repetition transmission is dropped), either to continue the Repetition transmission or to terminate the Repetition transmission, based on whether a determination condition (e.g., condition that uses threshold N relating to the number of times of Repetition transmission) is satisfied.

Thus, for example, when base station 100 may not detect the transmission presence/absence in the Configured grant transmission with Repetition applied, terminal 200 terminates Repetition transmission to suppress an unnecessary occupation of uplink resources in the Configured grant transmission or an increase in power consumption of terminal 200, thereby improving the communication efficiency in uplink. In addition, for example, the termination of the Repetition transmission makes it possible to avoid a situation where base station 100 erroneously determines that no transmission is performed in the Configured grant transmission even though terminal 200 has performed the transmission in the Configured grant transmission, for example.

Therefore, according to the present embodiment, the communication efficiency in uplink can be improved.

Embodiment 2

The configurations of base station 100 and terminal 200 according to the present embodiment may be the same as in Embodiment 1.

In the present embodiment, a case is assumed where base station 100 monitors, as a simple implementation of Configured grant PUSCH detection, first M slots of a Repetition resource for the Configured grant transmission configured in advance. For example, base station 100 accumulates outputs of DMRS symbols or DMRS correlation detection of the first M slots of the Repetition resource and, when an accumulation value is equal to or greater than a threshold, determines that terminal 200 has performed transmission in the Configured grant transmission.

For example, in Repetition transmission of Configured grant PUSCH transmission, when a slot in which no PUSCH transmission is performed (e.g., slot in which PUSCH transmission is dropped) is present in the first M slots of the Repetition resource for the Configured grant transmission configured in advance, terminal 200 may determine whether to cease the Repetition transmission (e.g., to stop transmission) after this slot.

Hereinafter, a description will be given of an exemplary operation of Repetition transmission in the present embodiment. In the following, among the exemplary operations of terminal 200 illustrated in FIG. 8, exemplary operations of terminal 200 in Step 1, Step 2, and Step 3 according to the present embodiment.

<Step 1>

Information on PUSCH repetition, such as time-resource allocation in a slot used for Repetition transmission and the number of repetition slots, K, may be indicated to terminal 200 (e.g., S101).

Terminal 200 determines an uplink slot available for PUSCH transmission based on the information on the PUSCH repetition to be indicated, for example (S102).

For example, in the case of PUSCH repetition Type A with continuous slot counting, the number of repetition slots, K, is a value counted based on consecutive slots. In the PUSCH repetition Type A with continuous slot counting, terminal 200 may configure the consecutive K slots to uplink slots available for the PUSCH transmission, for example.

Meanwhile, in the case of PUSCH repetition Type A with available slot counting, the number of repetition slots, K, is a value counted based on an uplink slot available for PUSCH transmission. In the PUSCH repetition Type A with available slot counting, for example, terminal 200 may determine the uplink slot available for the PUSCH transmission, based on SFI indication configured in advance by RRC and information on time-resource allocation in a slot for the PUSCH transmission. By way of example, in a certain slot, when time-resource allocation in the slot for PUSCH transmission collides with a downlink symbol configured in advance by RRC, terminal 200 need not include this slot in the uplink slot available for the PUSCH transmission.

Incidentally, the information on the time-resource allocation in the slot for the PUSCH transmission may be included in RRC, which had configuration relating to the Configured grant transmission (e.g., configuredGrantConfig (see NPL 7)), and then indicated to terminal 200, or may be included in time-domain resource allocation (TDRA) included in an Activation DCI and then indicated to terminal 200, for example.

<Step 2>

Terminal 200 determines whether to actually transmit PUSCH in the uplink slot available for the PUSCH transmission determined in Step 1 (e.g., the n-th PUCCH transmission occasion) (S103). Note that terminal 200 may count, as the number of repetition slots, a slot for which it has been determined to perform no PUSCH transmission (to drop PUSCH transmission) in Step 2.

In the case of PUSCH repetition Type A with continuous slot counting, terminal 200 may determine to transmit no PUSCH (to drop PUSCH transmission) in a certain slot in the following case where: time-resource allocation in the slot for the PUSCH transmission collides with a downlink symbol configured in advance by RRC; the time-resource allocation in the slot for the PUSCH transmission collides with a downlink symbol configured by a dynamic SFI indication (dynamic SFI); the time-resource allocation in the slot for the PUSCH transmission collides with a resource indicated by uplink-transmission-cancellation indication (UL CI); or the time-resource allocation in the slot for the PUSCH transmission collides with allocation of high-priority uplink transmission.

Meanwhile, in the case of PUSCH repetition Type A with available slot counting, terminal 200 may determine to transmit no PUSCH (to drop PUSCH transmission) in a certain slot in the following case where: time-resource allocation in the slot for the PUSCH transmission collides with a downlink symbol configured by a dynamic SFI indication (dynamic SFI); the time-resource allocation in the slot for the PUSCH transmission collides with a resource indicated by uplink-transmission-cancellation indication (UL CI); or the time-resource allocation in the slot for the PUSCH transmission collides with allocation of high-priority uplink transmission.

<Step 3>

When determining to transmit no PUSCH (to drop PUSCH transmission) in Step 2 (S104: Yes), terminal 200 may determine either to continue the Repetition transmission in slots positioned after the slot or to cease the Repetition transmission (stop transmission) after the slot, based on the above-mentioned methods (e.g., determination method using specified number, M) (S105).

For example, in FIG. 8, when determining to transmit no PUSCH (drop PUSCH transmission) in Step 2 (S104: Yes) and determining to cease the Repetition transmission (S106: Yes), terminal 200 ceases the Repetition transmission (terminates Repetition transmission) in slots positioned after the slot (S107).

On the other hand, when determining to transmit PUSCH in Step 2 (S104: No) or determining to continue the Repetition transmission (S106: No), terminal 200 continues the Repetition transmission in slots positioned after the slot (S108).

[Setting Examples of Specified Value M]

The specified value M (the number of first slots for Repetition) used in Step 3 for determining the continuation or the cessation of the Repetition transmission may be a value determined (or specified) by standards or a value (parameter) indicated from base station 100 to terminal 200.

In a case where the number of first slots for Repetition, M, is a value determined by standards, the value of M may be a value that does not depend on the number of Repetitions, K, for example. In one example, M may be set to two. For example, a required SNR in DMRS correlation detection for determining the transmission presence/absence in the Configured grant transmission may be small compared with a required SNR in decoding of PUSCH transmission. Hence, the value of M may be a value equal to or smaller than the number of Repetitions, K.

Alternatively, the value of M may be a different value depending on the number of Repetitions, K. For example, M may be set to one when the number of Repetitions, K, is four or less or may be set to two when the number of Repetitions, K, is more than four. The more the number of Repetitions is, the smaller the required SNR in the decoding of the PUSCH transmission is. Therefore, for example, setting a larger value of M reduces the required SNR in the DMRS correlation detection for determining the transmission presence/absence in the Configured grant transmission as the number of Repetitions increases, thus making it possible to match with the required SNR in the decoding of the PUSCH transmission.

Alternatively, the number of first slots, M, may be a different value depending on, in addition to the number of Repetitions, K, the number of DMRS symbols in a slot. In one example, when the number of Repetitions, K, is four or less, M may be set to one independent of the number of DMRS symbols in the slot. On the other hand, for example, in a situation where the number of Repetitions, K, is more than four, M may be set to two when the number of DMRS symbols in the slot is one, or M may be set to one when the number of DMRS symbols in the slot is greater than one. Since the required SNR in the DMRS correlation detection for determining the transmission presence/absence in the Configured grant transmission may be small as the number of DMRS symbols in the slot increases, the value of M need not be increased.

Meanwhile, in a case where the number of first slots for Repetition, M, is a parameter indicated from base station 100 to terminal 200, the value of M may be indicated from base station 100 to terminal 200 by RRC. The RRC parameter for indicating the value of M may be indicated by being included in DMRS-Config that configures information on DMRS, in pusch-Config that configures information on PUSCH, or in RRC having the configuration relating to the configured grant transmission (e.g., configuredGrantConfig), for example (e.g., see NPL 7).

Incidentally, the value of M may be indicated by a MAC-CE. Further, the value of M may be indicated by an Activation DCI. When the value of M is indicated by the Activation DCI, the value of M may be included in a TDRA table included in the Activation DCI or may be indicated by a specific bit field.

Further, the value of M may be indicated from base station 100 to terminal 200 by at least one (e.g., combination of at least two) of RRC, the MAC-CE, and the Activation DCI.

The value of M may be a value that is implicitly determined, without an explicit indication, based on indication information (another parameter) different from and other than the information on the determination rule that uses the value of M. For example, when channel estimation of composing DMRSs of multiple slots is applied to PUSCH repetition, a slot period (time domain window) that maintains phase continuity of a transmission signal or keeps transmission power of the transmission signal constant for terminal 200 can be configured. For example, the value of M may be set based on the time domain window. By way of example, the value of M may be set to the same value as the time domain window.

The setting examples of the number of first slots for Repetition, M, have been each described, thus far.

Figure 10:
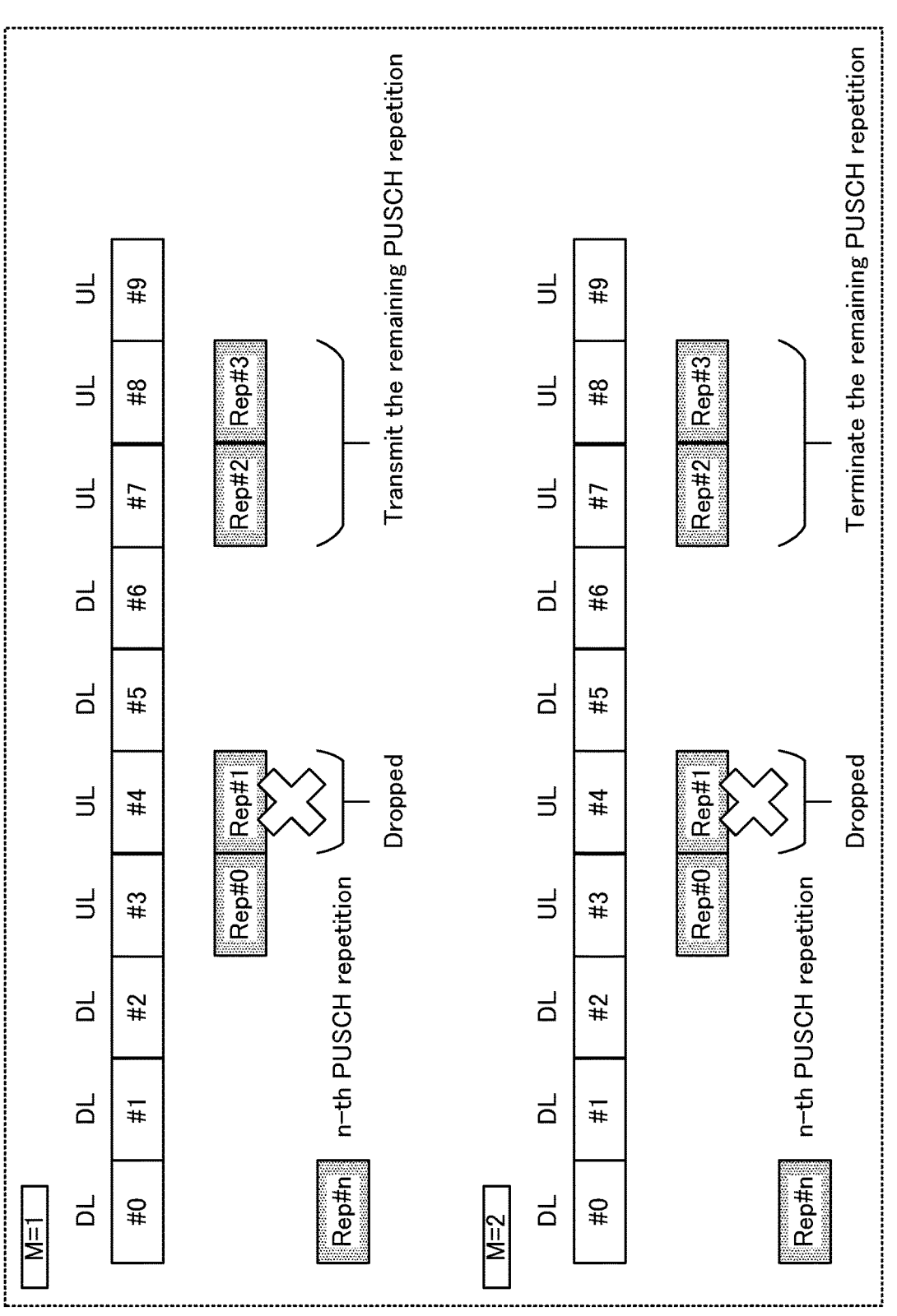
FIG. 10 illustrates an exemplary operation according to Embodiment 2.

FIG. 10 illustrates an exemplary operation of terminal 200 according to the present embodiment for PUSCH repetition Type A with available slot counting where the number of Repetitions, K, is four.

In FIG. 10, terminal 200 determines, in Step 1, slots #3, #4, #7, and #8 as uplink slots available for PUSCH transmission. Further, in FIG. 10, terminal 200 determines, in Step 2, to transmit no PUSCH (to drop PUSCH transmission) in slot #4.

For example, as illustrated in FIG. 10, in a case where M=1, PUSCH is transmitted in the period of the number of first slots for Repetition, M=1 (e.g., including slot #3). Accordingly, as illustrated in FIG. 10, in a case where M=1, terminal 200 continues the Repetition transmission after slot #4 (e.g., transmission in slots #7 and #8) even when it is determined to drop PUSCH transmission in slot #4. In this manner, in a situation where base station 100 is highly likely to detect the transmission presence/absence in the Configured grant transmission with Repetition applied, continuing the Repetition transmission makes it possible to improve the communication efficiency in uplink even when the Repetition transmission is dropped.

Further, for example, as illustrated in FIG. 10, in a case where M=2, PUSCH is not transmitted (PUSCH transmission is dropped) in at least a portion (e.g., slot #4) of the period of the number of first slots for Repetition, M=2 (e.g., including slots #3 and #4). Accordingly, as illustrated in FIG. 10, in a case where M=2, terminal 200 ceases the Repetition transmission (terminates PUSCH transmission) after slot #4 (e.g., transmission in slots #7 and #8) when it is determined to drop the PUSCH transmission in slot #4. Thus, in a situation where base station 100 is highly unlikely to detect the transmission presence/absence in the Configured grant transmission with Repetition applied, it is possible to suppress an unnecessary occupation of uplink resources and to suppress an increase in power consumption of terminal 200 by ceasing Repetition transmission, thus improving the communication efficiency in uplink.

As described above, according to the present embodiment, in a situation where base station 100 implements a simple PUSCH detection method in Repetition transmission for the Configured grant PUSCH transmission, terminal 200 ceases the Repetition transmission (e.g., terminates transmission) when no PUSCH transmission is performed (e.g., when PUSCH transmission is dropped) in first M slots used for the PUSCH detection performed by base station 100, and continues the Repetition transmission when the PUSCH transmission is performed in the first M slots.

Thus, when base station 100 may not detect the transmission presence/absence in the Configured grant transmission with Repetition applied, terminal 200 terminates Repetition transmission to suppress an unnecessary occupation of uplink resources in the Configured grant transmission or an increase in power consumption of terminal 200, thereby improving the communication efficiency in uplink. In addition, for example, the termination of the Repetition transmission makes it possible to avoid a situation where base station 100 erroneously determines that no transmission is performed in the Configured grant transmission even though terminal 200 has performed the transmission in the Configured grant transmission, for example.

Therefore, according to the present embodiment, the communication efficiency in uplink can be improved.

Embodiment 3

The configurations of base station 100 and terminal 200 according to the present embodiment may be the same as in Embodiment 1.

In the Configured grant transmission, a resource for the Configured grant transmission is configured by a fixed periodicity "P." In the PUSCH repetition Type A with continuous slot counting of Rel. 15 and Rel. 16, it is not assumed that Repetitions for the Configured grant transmission of the number of Repetitions, K, (e.g., K slots) becomes larger than a time length given by the periodicity P. For example, in Rel. 15 and Rel. 16, a UE transmits no PUSCH after the last slot of uplink slots available for PUSCH transmission given by consecutive K slots or the last uplink slot available for the PUSCH transmission within the periodicity P.

On the other hand, in the PUSCH repetition Type A with available slot counting of Rel. 17, the number of repetition slots, K, is a value counted based on an uplink slot available for PUSCH transmission. In Rel. 17, in some slot formats configured in advance by RRC, the uplink slot available for the PUSCH transmission may be postponed to a more rearward slot rather than consecutive slots. In this case, for example, a time length given by Repetitions for the Configured grant transmission of the number of Repetitions, K, (e.g., uplink slots available for K PUSCH transmissions) possibly becomes larger than the time length given by the periodicity P.

Figure 11:
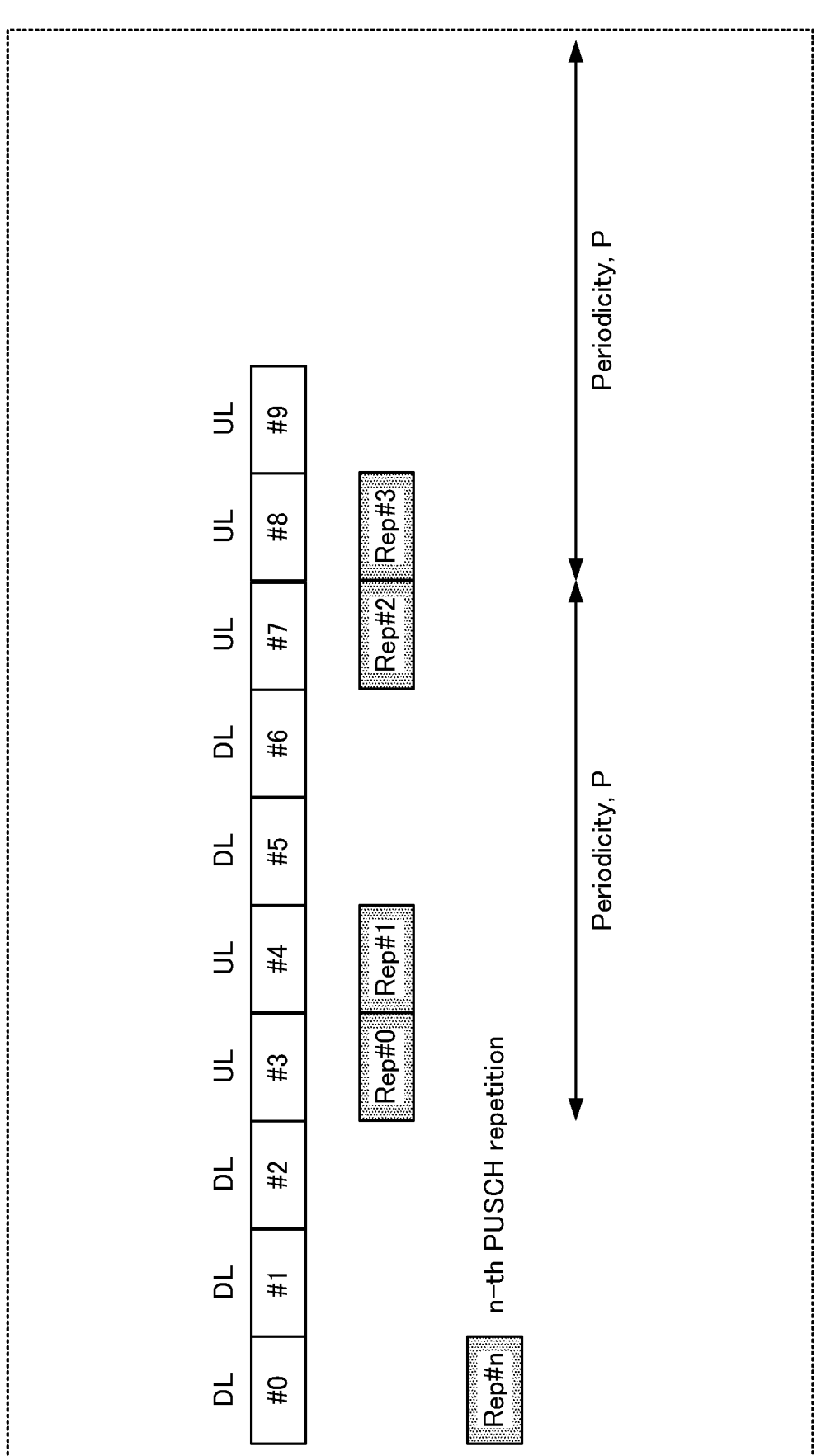
FIG. 11 illustrates an exemplary relation between a periodicity relating to resource configuration for Configured grant transmission and PUSCH repetition.

For example, in the example illustrated in FIG. 11, the time length given by uplink slots available for PUSCH transmission where K=4 (e.g., time length of six slots) is larger than the periodicity P (e.g., time length of five slots).

In the present embodiment, a description will be given of an exemplary operation of Repetition transmission taking the periodicity P into account. For example, in the present embodiment, an exemplary operation of the Repetition transmission will be described of a case where a time length given by Repetitions for the Configured grant transmission of the number of Repetitions, K, becomes larger than a time length given by the periodicity P.

In the present embodiment, terminal 200 may determine either to continue or to cease Repetition transmission (to terminate transmission) by taking a period corresponding to the periodicity P into account, in addition to the determination rule that uses the threshold N in Embodiment 1 or the determination rule that uses the number of first slots for Repetition, M, in Embodiment 2, for example.

Hereinafter, a description will be given of an exemplary operation of terminal 200 according to the present embodiment.

[Option 1]

In Option 1, terminal 200 ceases (stops) Repetition transmission after the uplink slot available for the last PUSCH transmission within the periodicity, P, for example. In other words, in Option 1, for example, it is not allowed that a time length given by Repetitions for the Configured grant transmission of the number of Repetitions, K, (e.g., uplink slots available for K PUSCH transmissions) becomes larger than a time length given by the periodicity P.

In Option 1, terminal 200 may use the threshold N in Embodiment 1 for the determination rule for determining the continuation or the cessation of Repetition transmission (termination of transmission), for example.

In Option 1, for example, terminal 200 may include a slot within a period of the periodicity P and possibly transmitting PUSCH, in calculation of the number of slots in which PUSCH can be transmitted (e.g., the number of uplink slots available for PUSCH transmission) after a slot in which no PUSCH is transmitted, whereas, the terminal need not include therein a slot outside the period of the periodicity P and possibly transmitting PUSCH. For example, in FIG. 11, of slots #3, #4, #7, and #8 used for the Repetition transmission, slots #3, #4, and #7 within a period corresponding to the periodicity P may be subject to determination using the threshold N, whereas slot #8 outside the period corresponding to the periodicity P may not be subject to the determination using the threshold N.

By way of example, in Step 2, terminal 200 continues the Repetition transmission in a case where the sum of the number of times PUSCH has been actually transmitted in slots positioned before a slot in which no PUSCH is transmitted (or PUSCH transmission is dropped) within a period corresponding to the periodicity P and the number of slots in which PUSCH can be transmitted (e.g., the number of uplink slots available for PUSCH transmission) after the slot in which no PUSCH is transmitted within the period corresponding to the periodicity P is equal to or greater than the threshold N.

On the other hand, in Step 2, in a case where the sum of the number of times PUSCH has been actually transmitted in slots positioned before a slot in which no PUSCH is transmitted within a period corresponding to the periodicity P and the number of slots in which PUSCH can be transmitted after the slot in which no PUSCH is transmitted within the period corresponding to the periodicity P is less than the threshold N, terminal 200 ceases the Repetition transmission (terminates transmission) after the slot in which no PUSCH is transmitted.

According to Option 1, for example, since Repetition is completed within the period of the periodicity P as with Rel. 15/16, the processing of terminal 200 can be simplified.

[Option 2]

In Option 2, for example, it is allowed that a time length given by Repetitions for the Configured grant transmission of the number of Repetitions, K, (e.g., uplink slots available for K PUSCH transmissions) becomes larger than a time length given by the periodicity P.

In other words, terminal 200 may continue the PUSCH repetition after the uplink slot available for the last PUSCH transmission within the periodicity P, for example. The uplink slot available for the PUSCH transmission can be postponed to a slot rearward beyond the period of the periodicity P, for example.

Incidentally, the maximum time length, $P_{max}$, within which an uplink slot available for PUSCH transmission is postponed may be defined. Terminal 200 may cease Repetition transmission (stop transmission) after the uplink slot available for the last PUSCH transmission within $P_{max}$, for example.

In Option 2, for example, even when an uplink slot available for PUSCH transmission exceeds a period of the periodicity P, the Repetition transmission is not ceased (stopped) within the periodicity P, thus improving the coverage performance.

Further, configuring the maximum time length, $P_{max}$, within which an uplink slot available for PUSCH transmission is postponed, makes it possible to suppress (e.g., limit) an increase in time length within which base station 100 buffers a received signal, thereby avoiding the complicated processing of base station 100.

For example, the maximum time length, $P_{max}$, within which an uplink slot available for PUSCH transmission is postponed may be configured as follows.

[Option 2-1]

In Option 2-1, $P_{max}$ may be configured to a time length that includes a period of a periodicity P next to the period given by the periodicity P of the Configured grant transmission. That is, $P_{max}$ may be configured to a time length given in 2×P.

Terminal 200 ceases (stops) Repetition transmission after the last uplink slot available for PUSCH transmission within $P_{max}$, for example. Additionally, for example, in the determination rule that uses the threshold N, a slot within a period of $P_{max}$ and possibly transmitting PUSCH, may be included in calculation of the number of slots in which PUSCH can be transmitted (e.g., the number of uplink slots available for PUSCH transmission) after a slot in which no PUSCH is transmitted, whereas, a slot outside the period of $P_{max}$ and possibly transmitting PUSCH need not be included therein.

[Option 2-2]

In Option 2-2, $P_{max}$ may be configured as a parameter independent of a periodicity P of the Configured grant transmission.

Terminal 200 ceases (stops) Repetition transmission after the last uplink slot available for PUSCH transmission within $P_{max}$, for example. Additionally, for example, in the determination rule that uses the threshold N, a slot within a period of $P_{max}$ and possibly transmitting PUSCH, may be included in calculation of the number of slots in which PUSCH can be transmitted (e.g., the number of uplink slots available for PUSCH transmission) after a slot in which no PUSCH is transmitted, whereas, a slot outside the period of $P_{max}$ and possibly transmitting PUSCH need not be included therein.

$P_{max}$ may be a value determined by standards or a parameter indicated from base station 100 to terminal 200.

When $P_{max}$ is a value determined by standards, the value of $P_{max}$ may be a value that does not depend on the number of Repetitions, K, for example. For example, $P_{max}$ may be set to 10 ms or 10 slots.

On the other hand, the value of $P_{max}$ may be a different value depending on the number of Repetitions, K, for example.

Meanwhile, in a case where $P_{max}$ is a parameter indicated from base station 100 to terminal 200, $P_{max}$ may be indicated from base station 100 to terminal 200 by RRC. The RRC parameter for indicating $P_{max}$ may be indicated by being included in DMRS-Config that configures information on DMRS, in pusch-Config that configures information on PUSCH, or in RRC having the configuration relating to the configured grant transmission (e.g., configuredGrantConfig), for example (e.g., see NPL 7).

Incidentally, $P_{max}$ may be indicated by a MAC-CE. Further, $P_{max}$ may be indicated by an Activation DCI. When $P_{max}$ is indicated by the Activation DCI, $P_{max}$ may be included in a TDRA table included in the Activation DCI or may be indicated by a specific bit field.

[Option 2-3]

In Option 2-3, $P_{max}$ may be configured to a time length obtained by multiplying the period given by the periodicity P of the Configured grant transmission by a factor. For example, $P_{max}$ may be configured to a time length given by $P_{max}=\alpha\times P$, where $\alpha$ is a scaling factor.

Terminal 200 ceases (stops) Repetition transmission after the last uplink slot available for PUSCH transmission within $P_{max}$, for example. Additionally, for example, in the determination rule that uses the threshold N, a slot within a period of $P_{max}$ and possibly transmitting PUSCH, may be included in calculation of the number of slots in which PUSCH can be transmitted (e.g., the number of uplink slots available for PUSCH transmission) after a slot in which no PUSCH is transmitted, whereas, a slot outside the period of $P_{max}$ and possibly transmitting PUSCH need not be included therein.

The scaling factor, $\alpha$, may be a value determined by standards or a parameter indicated from base station 100 to terminal 200.

When the scaling factor, $\alpha$, is a value determined by standards, the value of $\alpha$ may be a value that does not depend on the number of Repetitions, K, for example. In one of example, $\alpha$ may be set to two.

On the other hand, the value of $\alpha$ may be a different value depending on the number of Repetitions, K, for example.

Meanwhile, in a case where a is a parameter indicated from base station 100 to terminal 200, $\alpha$ may be indicated from base station 100 to terminal 200 by RRC. The RRC parameter for indicating $\alpha$ may be indicated by being included in DMRS-Config that configures information on DMRS, in pusch-Config that configures information on PUSCH, or in RRC having the configuration relating to the configured grant transmission (e.g., configuredGrantConfig), for example (e.g., see NPL 7).

Incidentally, $\alpha$ may be indicated by a MAC-CE. Further, $\alpha$ may be indicated by an Activation DCI. When $\alpha$ is indicated by the Activation DCI, $\alpha$ may be included in a TDRA table included in the Activation DCI or may be indicated by a specific bit field.

Option 1 and Option 2 have been each described, thus far.

In the present embodiment, for example, when continuing Repetition transmission in FIG. 8 (e.g., S108), terminal 200 may determine whether an uplink slot available for PUSCH transmission is the k-th slot or whether the uplink slot is an uplink slot available for the last PUSCH transmission within Pmax (S109). In a case where the uplink slot available for the PUSCH transmission is the K-th slot or the uplink slot available for the last PUSCH transmission within Pmax (S109: Yes), terminal 200 transmits PUSCH (S110). On the other hand, in a case where the uplink slot available for the PUSCH transmission is not the K-th slot nor the uplink slot available for the last PUSCH transmission within Pmax (S109: No), terminal 200 performs processing of Step 2 and Step 3 on an uplink slot available for the next PUSCH transmission.

Figure 12:
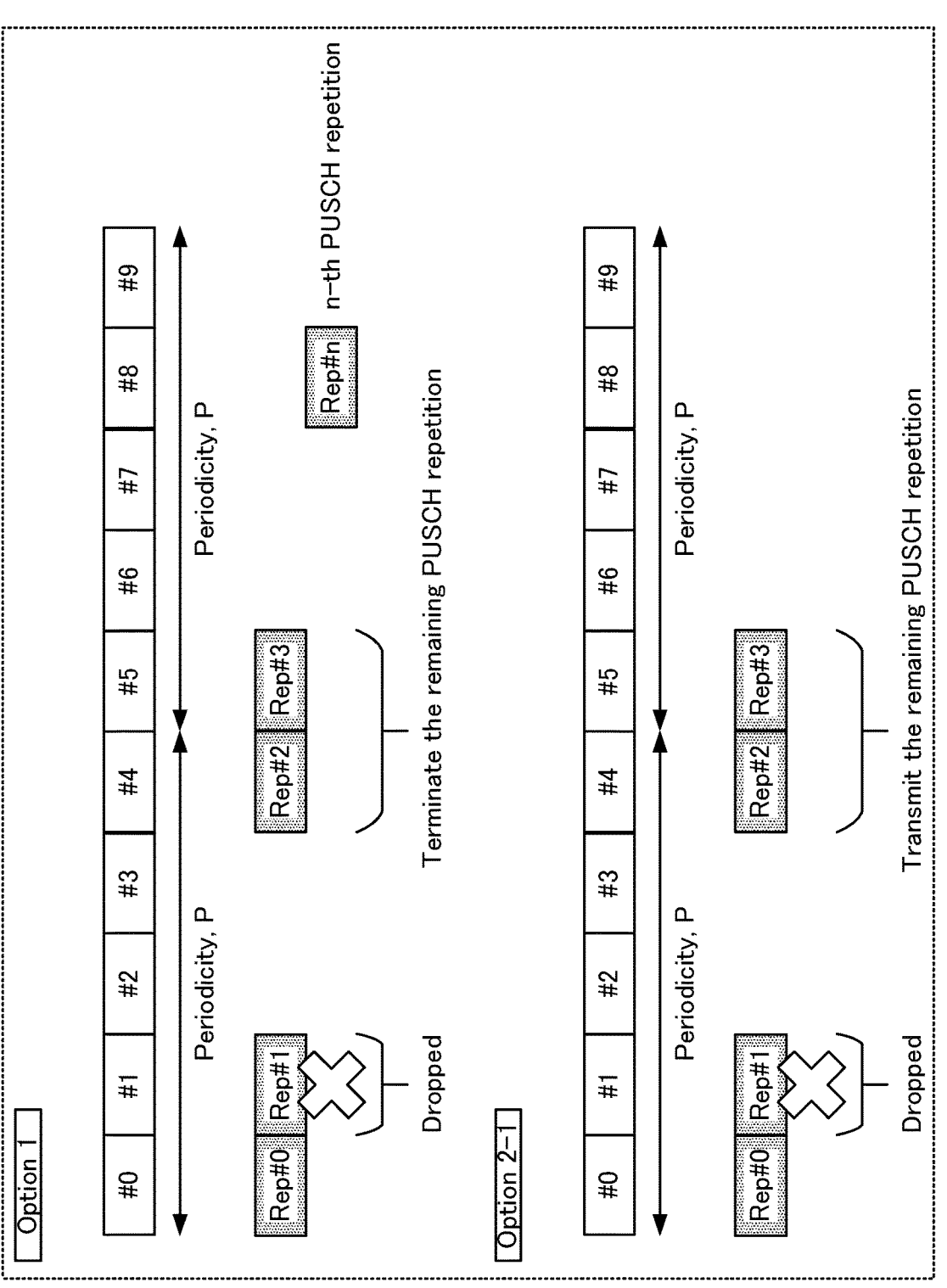
FIG. 12 illustrates an exemplary operation according to Embodiment 3.

FIG. 12 illustrates an exemplary operation of terminal 200 according to the present embodiment for PUSCH repetition Type A with available slot counting where the number of Repetitions, K, is four.

In FIG. 12, terminal 200 determines, in Step 1, slots #0, #1, #4, and #5 as uplink slots available for PUSCH transmission. Further, in FIG. 12, terminal 200 determines, in Step 2, to transmit no PUSCH (to drop PUSCH transmission) in slot #1. Note that FIG. 12 illustrates the example in which the threshold N=3.

As illustrated in FIG. 12, for example, in the case of Option 1, slot #4 is the uplink slot available for the last PUSCH transmission within the periodicity P. Hence, terminal 200 may determine to cease Repetition transmission (to stop transmission) after slot #4 (e.g., transmission in slot #5). Further, for example, within a period corresponding to the periodicity P (e.g., before slot #4), the sum (twice) of the number of times PUSCH has been actually transmitted (once in slot #0) in a slot positioned before slot #1 in which PUSCH transmission is dropped and the number of times PUSCH can be transmitted after slot #1 (e.g., the number of uplink slots available for PUSCH transmission; once in slot #4) is less than the threshold N=3. Hence, terminal 200 may determine to cease Repetition transmission (to stop transmission) after slot #1 (e.g., transmission in slot #4).

In this manner described above, in Option 1 illustrated in FIG. 12, terminal 200 may cease, of the Repetition transmission, transmission in slots #4 and #5.

Further, as illustrated in FIG. 12, for example, in the case of Option 2-1, it is allowed that a time length given by Repetitions for the Configured grant transmission of the number of Repetitions, K=4, (e.g., uplink slots available for K PUSCH transmissions) becomes larger than a time length given by the periodicity P. Thus, $P_{max}$ is configured to a time length that includes a period of a periodicity P next to the period given by the periodicity P of the Configured grant transmission (e.g., $P_{max}=2\times P$). In Option 2-1 illustrated in FIG. 12, for example, the sum (three times) of the number of times PUSCH has been actually transmitted (once) in a slot positioned before slot #1 in which PUSCH transmission is dropped and the number of times PUSCH can be transmitted after slot #1 (e.g., the number of uplink slots available for PUSCH transmission; twice in slots #4 and #5) is equal to or greater than the threshold N=3. Hence, terminal 200 continues Repetition transmission after slot #1 (e.g., transmission in slots #4 and #5).

As described above, according to the present embodiment, terminal 200 can improve the efficiency of Repetition transmission by taking periodicity P into account.

In the present embodiment, as an example, a case has been described where the threshold N in Embodiment 1 is used for a determination rule for determining the continuation or the cessation of Repetition transmission (termination of transmission), but the present disclosure is not limited to this case, and the specified value M in Embodiment 2 may be used, for example.

By way of example, terminal 200 may determine to cease the Repetition transmission (to terminate transmission) when no PUSCH transmission is performed (Repetition transmission is dropped) in first M slots of a Repetition resource within a period corresponding to a periodicity P (or $P_{max}$). On the other hand, for example, terminal 200 may determine to continue the Repetition transmission when the PUSCH transmission is performed (Repetition transmission is performed) in the first M slots of the Repetition resource within the period corresponding to the periodicity P (or $P_{max}$).

Variation of Embodiment 3

In Embodiment 3, the operation on Repetition in the Configured grant transmission has been described, but the maximum time length, $P_{max}$, within which an uplink slot available for PUSCH transmission is postponed may be applied to Dynamic grant transmission, without limitation to the Configured grant transmission.

When the maximum time length within which an uplink slot available for PUSCH transmission is postponed is applied to the Dynamic grant transmission, the same value as $P_{max}$, which is configured for the Configured grant transmission, may be applied. This reduces overhead of indicating $P_{max}$ to terminal 200.

Besides, the maximum time length within which an uplink slot available for PUSCH transmission is postponed may be configured independently for the Dynamic grant transmission (represented by, e.g., "$P_{max, DG}$") and for the Configured grant transmission (represented by, e.g., "$P_{max, CG}$"). This makes it possible to flexibly configure, for PUSCH transmission methods in the Configured grant transmission and the Dynamic grant transmission, respectively, the maximum time length within which an uplink slot available for PUSCH transmission is postponed.

Further, in the Configured grant transmission, when the maximum time length for the Configured grant transmission, $P_{max, CG}$, within which an uplink slot available for PUSCH transmission is postponed is given, terminal 200 may apply $P_{max, CG}$ to the Configured grant transmission, and when $P_{max, CG}$ is not given, the terminal may apply the maximum time length for the Dynamic grant transmission, $P_{max, DG}$, within which an uplink slot available for PUSCH transmission is postponed. Meanwhile, when neither $P_{max, CG}$ nor $P_{max, DG}$ is given, terminal 200 may apply a default value, for example. The default value may be, for example, a periodicity P of the Configured grant transmission or a value of an integral multiple of the periodicity P of the Configured grant transmission.

The embodiments according to a non-limiting example of the present disclosure have been each described, thus far.

Whether to apply the embodiments, variation, or Options in the embodiments described above may be configured on terminal 200 by RRC. Further, whether terminal 200 applies the embodiments, variation, or Options in the embodiments described above may be configured on terminal 200 by the Activation DCI.

The embodiments, variation, and Options in the embodiments described above may be applied to the PUSCH repetition Type B as well as the PUSCH repetition Type A. Further, whether to apply the embodiments, variation, or Options in the embodiments described above may be individually configured for each PUSCH repetition method. For example, whether to apply the embodiments, variation, or Options in the embodiments described above may be individually configured for the PUSCH repetition Type A with continuous slot counting, the PUSCH repetition Type A with available slot counting, and the PUSCH repetition Type B, as the PUSCH repetition methods.

Note that, when the embodiments, variation, and Options in the embodiments described above are applied to the PUSCH repetition Type B, the values of N and M may be applied by replacing "the number of slots" with "the number of Repetitions."

Further, whether to apply the embodiments, variation, or Options in the embodiments described above may be individually configured for each Configured grant type. For example, whether to apply the embodiments, variation, or Options in the embodiments described above may be individually configured for the Type A and the Type B, as the Configured grant types. Alternatively, in a case where a plurality of Configured grant configurations can be configured, whether to apply the embodiments, variation, or Options in the embodiments described above may be individually configured for each of the Configured grant configurations.

Further, the embodiments, variation, and Options in the embodiments described above may be different depending on the PUSCH repetition method. Alternatively, the embodiments, variation, and Options in the embodiments described above may be different per Configured grant type.

Further, the embodiments, variation, or Options in the embodiments described above may be switchable within the same configuration (e.g., PUSCH repetition method, Configured grant type, or channel type).

In the embodiments, variation, and Options in the embodiments described above, a case has been described where a non-limiting example of the present disclosure is applied to PUSCH repetition, but application of a non-limiting example of the present disclosure is not limited to the PUSCH repetition. For example, a non-limiting example of the present disclosure may be applied to TB processing over multi-slot PUSCH (TBoMS), introduction of which has been discussed in Rel. 17, or may be applied to a case where multiple-slot channel estimation is applied between a plurality of PUSCHs.

Further, in the embodiments, variation, and Options in the embodiments described above, a case has been described where a non-limiting example of the present disclosure is applied to PUSCH repetition for the Configured grant transmission, but application of a non-limiting example of the present disclosure is not limited to the PUSCH repetition for the Configured grant transmission. For example, a non-limiting example of the present disclosure may be applied to an uplink control channel (e.g., Physical Uplink Control CHannel (PUCCH)) via which a Scheduling Request (SR) or periodic/semi-persistent CSI is transmitted.

The embodiments, variation, and Options in the embodiments described above may be applied to PUSCH repetition for the Dynamic grant transmission or PUCCH via which Hybrid Automatic Repeat reQuest-ACKnowledgement (HARQ-ACK) is transmitted.

Further, the embodiments, variation, and Options in the embodiments described above may be applied to downlink transmission or sidelink transmission, without limitation to uplink transmission.

In Rel. 16, for example, uplink transmission such as PUSCH or ACK/NACK can be configured with a priority level. For example, the number of priority levels is two in Rel. 16; thus, uplink transmission configured with priority index 0 is low in priority, whereas uplink transmission configured with priority index 1 is high in priority. The embodiments, variation, and Options in the embodiments described above may be different depending on the priority of uplink transmission.

Further, in the embodiments, variation, and Options in the embodiments described above, a description has been given of a comparison between the value of threshold N and the number of slots for transmitting PUSCH. The present disclosure is not limited to this, however, and the number of slots to be compared with the value of threshold N may be replaced with the number of slots in which no PUSCH is transmitted (PUSCH is dropped), for example.

In the embodiments or variation described above, a description has been given of an application example to the PUSCH transmission in units of slots, but the units for PUSCH transmission are not limited to slots. For example, the units for PUSCH transmission may be subslots introduced in NR Rel. 16. In the PUSCH transmission in units of subslots, the number of symbols included in a subslot is less than that in a slot. By way of example, when the number of symbols included in the slot is 14 (or 12), the number of symbols included in the subslot may be 2 or 7 (or 6).

Further, depending on whether the PUSCH transmission units are slots or subslots, application of the embodiments or variation may be controlled (e.g., enabled or disabled). Alternatively, depending on whether the PUSCH transmission units are slots or subslots, an embodiment or variation to be applied may be different.

Further, parameter values, such as the number of Repetitions, threshold N, M, periodicity P, and the number of slots, which have been applied in the descriptions of the above embodiments, are exemplary and may be other values.

(Complements)

Information indicating whether terminal 200 supports the functions, operations, or processes that have been described in the above-mentioned embodiments, variations, and complements may be transmitted (or indicated) from terminal 200 to base station 100, as capability information or a capability parameter for terminal 200, for example.

The capacity information may include information elements (IEs) that individually indicate whether terminal 200 supports at least one of the functions, operations, or processes that have been described in the above-mentioned embodiments, variations, and complements. Alternatively, the capability information may include information elements that indicate whether terminal 200 supports a combination of any two or more of the functions, operations, or processes that have been described in the above-mentioned embodiments, variations, and complements.

Base station 100 may determine (or decide or assume), for example, based on the capability information received from terminal 200, the functions, operations, or processes that are supported (or not supported) by terminal 200, which is a transmission source of the capability information. Base station 100 may execute operations, processes, or control in accordance with a determination result based on the capability information. By way of example, base station 100 may control, based on the capability information received from terminal 200, allocation (i.e., scheduling) of at least one uplink resource such as PUSCH.

Note that in a case where terminal 200 does not entirely support the functions, operations, or processes described in the above-mentioned embodiments, variations, and complements, such an unsupported part of the functions, operations, or processes may be interpreted as a limitation in terminal 200. For example, information or a request relating to such limitation may be indicated to base station 100.

The information on the capability or the limitation of terminal 200 may be defined by standards or may be implicitly indicated to base station 100 in association with information known in base station 100 or information to be transmitted to base station 100, for example.

The embodiments, the variations, and the complements according to anon-limiting example of the present disclosure have been each described, thus far.

Incidentally, in the present disclosure, Repetition may also be referred to as, for example, slot aggregation, slot bundling, TTI aggregation, or TTI bundling.

The present disclosure may be applied to, for example, communication between terminals, such as a sidelink communication.

Further, in the present disclosure, a downlink control channel, a downlink data channel, an uplink control channel, and an uplink data channel are not limited to PDCCH, PDSCH, PUCCH, and PUSCH, respectively, and may be control channels having other names.

Further, in the present disclosure, the RRC signaling is assumed for the higher layer signaling, but the signaling may be replaced with Medium Access Control (MAC) signaling and indication by a DCI that is physical layer signaling.

(Control Signals)

In the present disclosure, the downlink control signal (information) related to the present disclosure may be a signal (information) transmitted through PDCCH of the physical layer or may be a signal (information) transmitted through a MAC Control Element (CE) of the higher layer or the RRC. The downlink control signal may be a pre-defined signal (information).

The uplink control signal (information) related to the present disclosure may be a signal (information) transmitted through PUCCH of the physical layer or may be a signal (information) transmitted through a MAC CE of the higher layer or the RRC. Further, the uplink control signal may be a pre-defined signal (information). The uplink control signal may be replaced with uplink control information (UCI), the 1st stage sidelink control information (SCI) or the 2nd stage SCI.

(Base Station)

In the present disclosure, the base station may be a Transmission Reception Point (TRP), a clusterhead, an access point, a Remote Radio Head (RRH), an eNodeB (eNB), a gNodeB (gNB), a Base Station (BS), a Base Transceiver Station (BTS), a base unit or a gateway, for example. Further, in side link communication, a base station may be adopted instead of a terminal. The base station may be a relay apparatus that relays communication between a higher node and a terminal. The base station may be a roadside unit as well.

(Uplink/Downlink/Sidelink)

The present disclosure may be applied to any of uplink, downlink and sidelink. The present disclosure may be applied to, for example, uplink channels, such as PUSCH, PUCCH, and PRACH, downlink channels, such as PDSCH, PDCCH, and PBCH, and side link channels, such as Physical Sidelink Shared Channel (PSSCH), Physical Sidelink Control Channel (PSCCH), and Physical Sidelink Broadcast Channel (PSBCH).

PDCCH, PDSCH, PUSCH, and PUCCH are examples of a downlink control channel, a downlink data channel, an uplink data channel, and an uplink control channel, respectively. PSCCH and PSSCH are examples of a sidelink control channel and a sidelink data channel, respectively. PBCH and PSBCH are examples of broadcast channels, respectively, and PRACH is an example of a random access channel.

(Data Channels/Control Channels)

The present disclosure may be applied to any of data channels and control channels. The channels in the present disclosure may be replaced with data channels including PDSCH, PUSCH and PSSCH and/or control channels including PDCCH, PUCCH, PBCH, PSCCH, and PSBCH.

(Reference Signals)

In the present disclosure, the reference signals are signals known to both a base station and a mobile station and each reference signal may be referred to as a Reference Signal (RS) or sometimes a pilot signal. The reference signal may be any of a DMRS, a Channel State Information-Reference Signal (CSI-RS), a Tracking Reference Signal (TRS), a Phase Tracking Reference Signal (PTRS), a Cell-specific Reference Signal (CRS), and a Sounding Reference Signal (SRS).

(Time Intervals)

In the present disclosure, time resource units are not limited to one or a combination of slots and symbols, and may be time resource units, such as frames, superframes, subframes, slots, time slots, subslots, minislots, or time resource units, such as symbols, Orthogonal Frequency Division Multiplexing (OFDM) symbols, Single Carrier-Frequency Division Multiple Access (SC-FDMA) symbols, or other time resource units. The number of symbols included in one slot is not limited to any number of symbols exemplified in the embodiment(s) described above, and may be other numbers of symbols.

(Frequency Bands)

The present disclosure may be applied to any of a licensed band and an unlicensed band.

(Communication)

The present disclosure may be applied to any of communication between a base station and a terminal (Uu-link communication), communication between a terminal and a terminal (Sidelink communication), and Vehicle to Everything (V2X) communication. The channels in the present disclosure may be replaced with PSCCH, PSSCH, Physical Sidelink Feedback Channel (PSFCH), PSBCH, PDCCH, PUCCH, PDSCH, PUSCH, and PBCH.

In addition, the present disclosure may be applied to any of a terrestrial network or a network other than a terrestrial network (NTN: Non-Terrestrial Network) using a satellite or a High Altitude Pseudo Satellite (HAPS). In addition, the present disclosure may be applied to a network having a large cell size, and a terrestrial network with a large delay compared with a symbol length or a slot length, such as an ultra-wideband transmission network.

(Antenna Ports)

An antenna port refers to a logical antenna (antenna group) formed of one or more physical antenna(s). That is, the antenna port does not necessarily refer to one physical antenna and sometimes refers to an array antenna formed of multiple antennas or the like. For example, it is not defined how many physical antennas form the antenna port, and instead, the antenna port is defined as the minimum unit through which a terminal is allowed to transmit a reference signal. The antenna port may also be defined as the minimum unit for multiplication of a precoding vector weighting.

<5G NR System Architecture and Protocol Stack>

3GPP has been working on the next release for the 5th generation cellular technology (simply called "5G"), including the development of a new radio access technology (NR) operating in frequencies ranging up to 100 GHz. The first version of the 5G standard was completed at the end of 2017, which allows proceeding to 5G NR standard-compliant trials and commercial deployments of terminals (e.g., smartphones).

Figure 13:
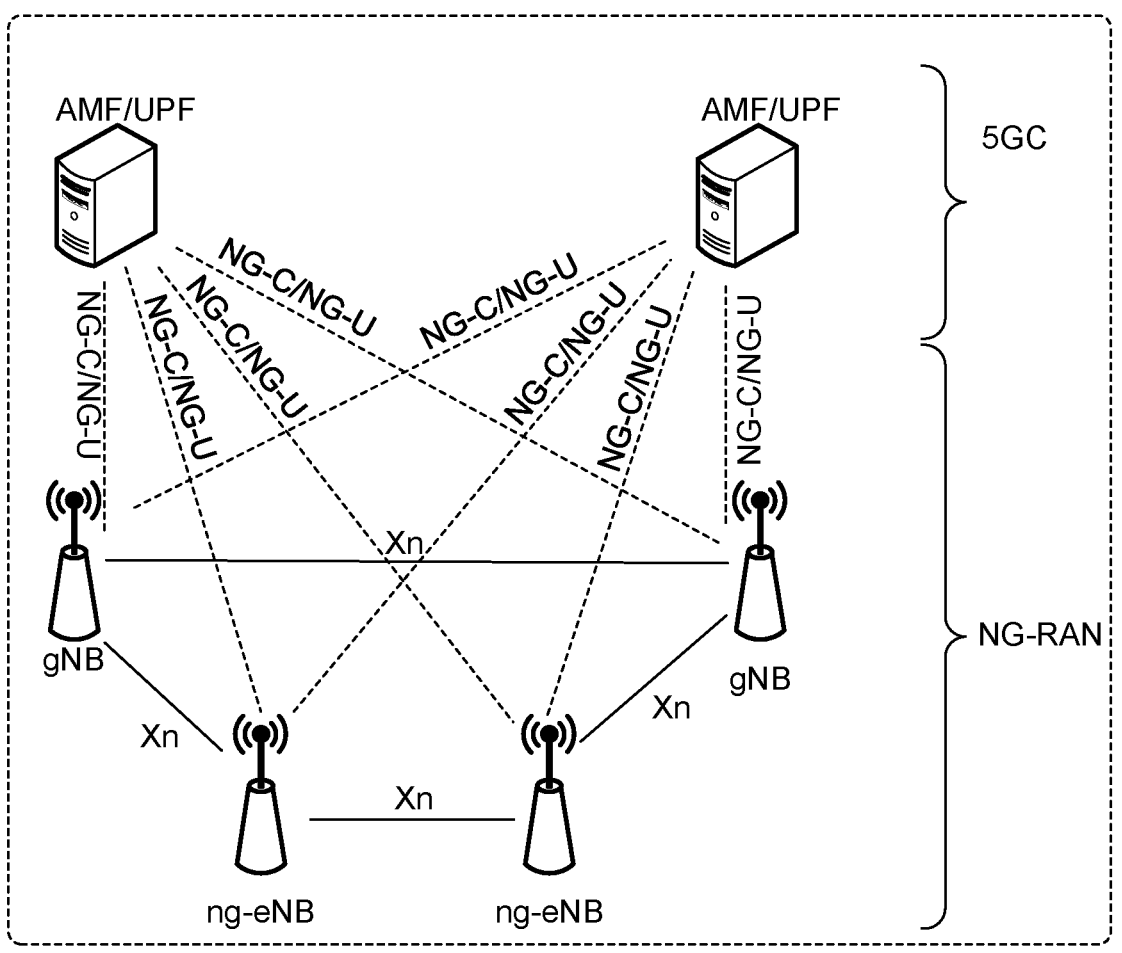
FIG. 13 illustrates an exemplary architecture of a 3GPP NR system.

For example, the overall system architecture assumes an NG-RAN (Next Generation-Radio Access Network) that includes gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 13 (see e.g., 3GPP TS 38.300 v15.6.0, section 4).

The user plane protocol stack for NR (see e.g., 3GPP TS 38.300, section 4.4.1) includes the PDCP (Packet Data Convergence Protocol, see clause 6.4 of TS 38.300), RLC (Radio Link Control, see clause 6.3 of TS 38.300) and MAC (Medium Access Control, see clause 6.2 of TS 38.300) sublayers, which are terminated in the gNB on the network side. Additionally, a new Access Stratum (AS) sublayer (SDAP, Service Data Adaptation Protocol) is introduced above the PDCP (see e.g., clause 6.5 of 3GPP TS 38.300). A control plane protocol stack is also defined for NR (see for instance TS 38.300, section 4.4.2). An overview of the Layer 2 functions is given in clause 6 of TS 38.300. The functions of the PDCP, RLC, and MAC sublayers are listed respectively in clauses 6.4, 6.3, and 6.2 of TS 38.300. The functions of the RRC layer are listed in clause 7 of TS 38.300.

For instance, the Medium Access Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. The physical layer also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. Examples of the physical channel include a Physical Random Access Channel (PRACH), a Physical Uplink Shared Channel (PUSCH), and a Physical Uplink Control Channel (PUCCH) as uplink physical channels, and a Physical Downlink Shared Channel (PDSCH), a Physical Downlink Control Channel (PDCCH), and a Physical Broadcast Channel (PBCH) as downlink physical channels.

Use cases/deployment scenarios for NR could include enhanced mobile broadband (eMBB), ultra-reliable low-latency communications (URLLC), and massive machine type communication (mMTC), which have diverse requirements in terms of data rates, latency, and coverage. For example, eMBB is expected to support peak data rates (20 Gbps for downlink and 10 Gbps for uplink) and user-experienced data rates on the order of three times what is offered by IMT-Advanced. On the other hand, in case of URLLC, the tighter requirements are put on ultra-low latency (0.5 ms for UL and DL each for user plane latency) and high reliability (1-10-5 within 1 ms). Finally, mMTC may preferably require high connection density (1,000,000 devices/km$^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, and number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacings of 15 kHz, 30 kHz, and 60 kHz . . . are being considered at the moment. The symbol duration Tu and the subcarrier spacing Δf are directly related through the formula Δf=1/Tu. In a similar manner as in LTE systems, the term "resource element" can be used to denote a minimum resource unit being composed of one subcarrier for the length of one OFDM/SC-FDMA symbol.

In the new radio system 5G-NR for each numerology and each carrier, resource grids of subcarriers and OFDM symbols are defined respectively for uplink and downlink. Each element in the resource grids is called a resource element and is identified based on the frequency index in the frequency domain and the symbol position in the time domain (see 3GPP TS 38.211 v15.6.0).

<Functional Split Between NG-RAN and 5GC in 5G NR>

Figure 14:
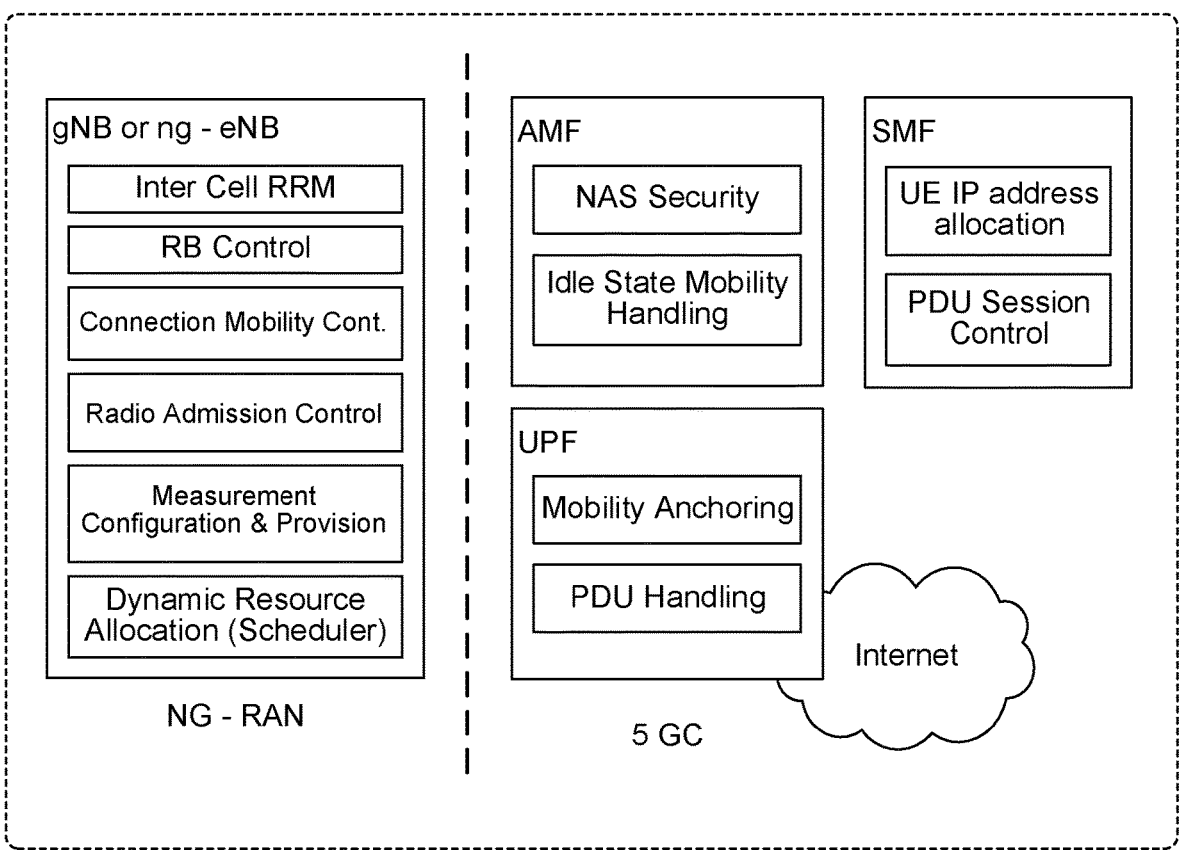
FIG. 14 schematically illustrates a functional split between Next Generation-Radio Access Network (NG-RAN) and 5th Generation Core (5GC)

FIG. 14 illustrates the functional split between the NG-RAN and the 5GC. A logical node of the NG-RAN is gNB or ng-eNB. The 5GC includes logical nodes AMF, UPF, and SMF.

For example, gNB and ng-eNB hosts the following main functions:

Radio Resource Management functions such as Radio Bearer Control, Radio Admission Control, Connection Mobility Control, and dynamic allocation (scheduling) of both uplink and downlink resources to a UE;

IP header compression, encryption, and integrity protection of data;

Selection of an AMF during UE attachment in such a case when no routing to an AMF can be determined from the information provided by the UE;

Routing user plane data towards the UPF;

Routing control plane information towards the AMF;

Connection setup and release;

Scheduling and transmission of paging messages;

Scheduling and transmission of system broadcast information (originated from the AMF or an operation management maintenance function (OAM: Operation, Admission, Maintenance));

Measurement and measurement reporting configuration for mobility and scheduling;

Transport level packet marking in the uplink;

Session management;

Support of network slicing;

QoS flow management and mapping to data radio bearers;

Support of UEs in the RRC_INACTIVE state;

Distribution function for NAS messages;

Radio access network sharing;

Dual connectivity; and

Tight interworking between NR and E-UTRA.

The Access and Mobility Management Function (AMF) hosts the following main functions:

Function of Non-Access Stratum (NAS) signaling termination;

NAS signaling security;

Access Stratum (AS) security control;

Inter-Core Network (CN) node signaling for mobility between 3GPP access networks;

Idle mode UE reachability (including control and execution of paging retransmission);

Registration area management;

Support of intra-system and inter-system mobility;

Access authentication;

Access authorization including check of roaming rights;

Mobility management control (subscription and policies);

Support of network slicing; and

Session Management Function (SMF) selection.

In addition, the User Plane Function (UPF) hosts the following main functions:

Anchor Point for intra-/inter-RAT mobility (when applicable);

External Protocol Data Unit (PDU) session point for interconnection to a data network;

Packet routing and forwarding;

Packet inspection and a user plane part of Policy rule enforcement;

Traffic usage reporting;

Uplink classifier to support routing traffic flows to a data network;

Branching point to support multi-homed PDU session;

QoS handling for user plane (e.g., packet filtering, gating, UL/DL rate enforcement);

Uplink traffic verification (SDF to QoS flow mapping); and

Function of downlink packet buffering and downlink data notification triggering.

Finally, the Session Management Function (SMF) hosts the following main functions:

Session management;

UE IP address allocation and management;

Selection and control of UPF;

Configuration function for traffic steering at the User Plane Function (UPF) to route traffic to a proper destination;

Control part of policy enforcement and QoS; and

Downlink data notification.

<RRC Connection Setup and Reconfiguration Procedure>

Figure 15:
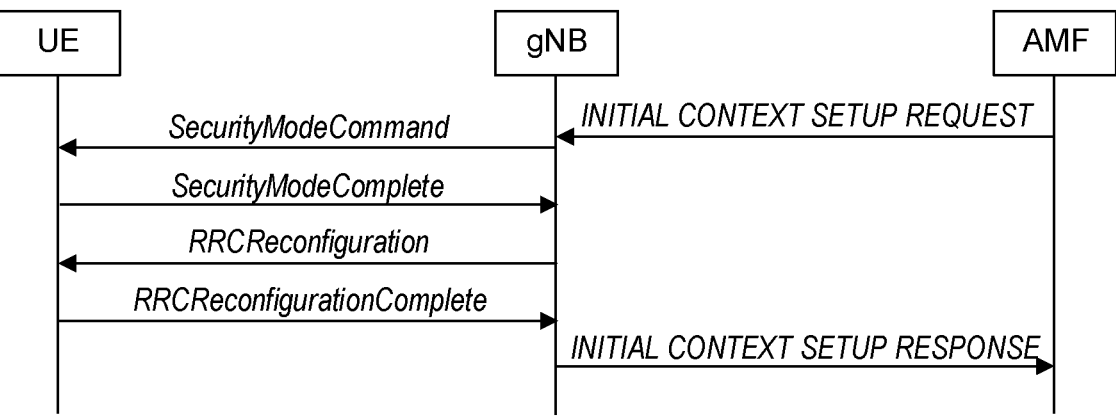
FIG. 15 is a sequence diagram of a Radio Resource Control (RRC) connection setup/reconfiguration procedure.

FIG. 15 illustrates some interactions between a UE, gNB, and AMF (a 5GC Entity) performed in the context of a transition of the UE from RRC_IDLE to RRC_CONNECTED for the NAS part (see TS 38 300 v15.6.0).

The RRC is higher layer signaling (protocol) used to configure the UE and gNB. With this transition, the AMF prepares UE context data (which includes, for example, a PDU session context, security key, UE Radio Capability, UE Security Capabilities, and the like) and sends it to the gNB with an INITIAL CONTEXT SETUP REQUEST. Then, the gNB activates the AS security with the UE. This activation is performed by the gNB transmitting to the UE a SecurityModeCommand message and by the UE responding to the gNB with the SecurityModeComplete message. Afterwards, the gNB performs the reconfiguration to setup the Signaling Radio Bearer 2 (SRB2) and Data Radio Bearer(s) (DRB(s)) by means of transmitting to the UE the RRCReconfiguration message and, in response, receiving by the gNB the RRCReconfigurationComplete from the UE. For a signaling-only connection, the steps relating to the RRCReconfiguration are skipped since SRB2 and DRBs are not set up. Finally, the gNB indicates the AMF that the setup procedure is completed with INITIAL CONTEXT SETUP RESPONSE.

Thus, the present disclosure provides a 5th Generation Core (5GC) entity (e.g., AMF, SMF, or the like) including control circuitry, which, in operation, establishes a Next Generation (NG) connection with a gNodeB, and a transmitter, which in operation, transmits an initial context setup message to the gNodeB via the NG connection such that a signaling radio bearer between the gNodeB and a User Equipment (UE) is set up. Specifically, the gNodeB transmits Radio Resource Control (RRC) signaling including a resource allocation configuration Information Element (IE) to the UE via the signaling radio bearer. Then, the UE performs an uplink transmission or a downlink reception based on the resource allocation configuration.

<Usage Scenarios of IMT for 2020 and Beyond>

Figure 16:
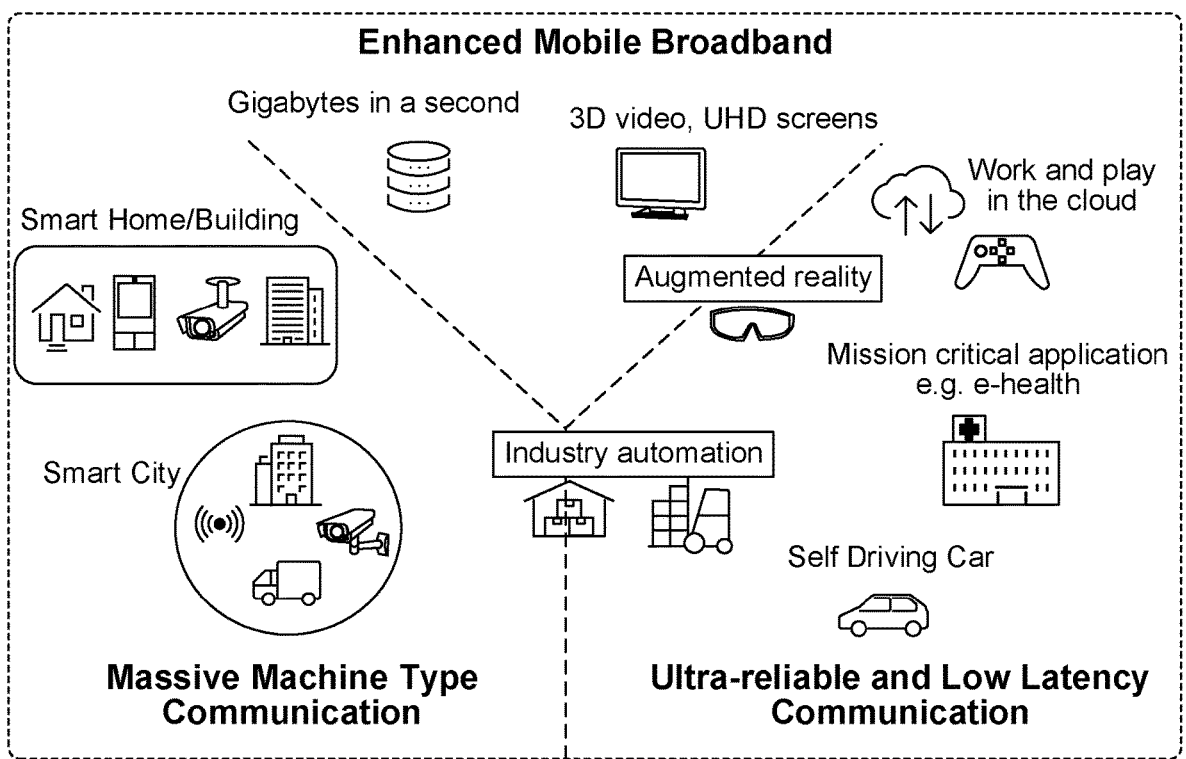
FIG. 16 schematically illustrates usage scenarios of enhanced Mobile BroadBand (eMBB), massive Machine Type Communications (mMTC), and Ultra Reliable and Low Latency Communications (URLLC)

FIG. 16 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications (mMTC). FIG. 16 illustrates some examples of envisioned usage scenarios for IMT for 2020 and beyond (see e.g., ITU-R M.2083 FIG. 2).

The URLLC use case has stringent requirements for capabilities such as throughput, latency and availability. The URLLC use case has been envisioned as one of the enablers for future vertical applications such as wireless control of industrial manufacturing or production processes, remote medical surgery, distribution automation in a smart grid, transportation safety. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a block error rate (BLER) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, or the like. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, for example, for URLLC and mMTC, is high reliability or ultra-reliability. Several mechanisms can improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability improvement in general, regardless of particular communication scenarios.

For NR URLLC, further use cases with tighter requirements have been envisioned such as factory automation, transport industry and electrical power distribution. The tighter requirements are higher reliability (up to 10-6 level), higher availability, packet sizes of up to 256 bytes, time synchronization up to the extent of a few μs (where the value can be one or a few μs depending on frequency range and short latency on the order of 0.5 to 1 ms (in particular a target user plane latency of 0.5 ms), depending on the use cases).

Moreover, for NR URLLC, several technology enhancements from physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements are possible. The term "mini-slot" refers to a Transmission Time Interval (TTI) including a smaller number of symbols than a slot (a slot comprising fourteen symbols).

<QoS Control>

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU sessions. For each UE, the NG-RAN establishes at least one Data Radio Bearer (DRB) together with the PDU session, e.g., as illustrated above with reference to FIG. 15. Further, additional DRB(s) for QoS flow(s) of that PDU session can be subsequently configured (it is up to NG-RAN when to do so). The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 17:
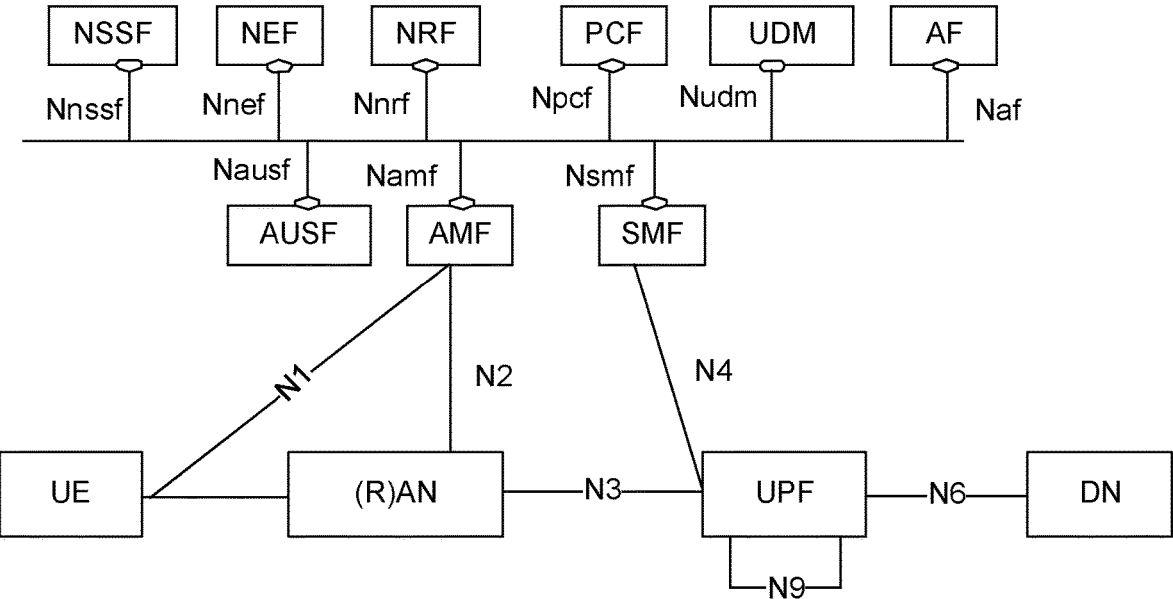
FIG. 17 is a block diagram illustrating an exemplary 5G system architecture for anon-roaming scenario.

FIG. 17 illustrates a 5G NR non-roaming reference architecture (see TS 23.501 v16.1.0, section 4.23). An Application Function (AF) (e.g., an external application server hosting 5G services, exemplarily described in FIG. 16) interacts with the 3GPP Core Network in order to provide services, for example to support application influencing on traffic routing, accessing Network Exposure Function (NEF) or interacting with the policy framework for policy control (e.g., QoS control) (see Policy Control Function, PCF). Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 17 illustrates further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN, e.g., operator services, Internet access, or third party services). All of or a part of the core network functions and the application services may be deployed and running on cloud computing environments.

In the present disclosure, thus, an application server (e.g., AF of the 5G architecture), is provided that includes: a transmitter, which in operation, transmits a request containing a QoS requirement for at least one of URLLC, eMMB and mMTC services to at least one of functions (such as NEF, AMF, SMF, PCF, and UPF) of the 5GC to establish a PDU session including a radio bearer between a gNodeB and a UE in accordance with the QoS requirement; and control circuitry, which, in operation, performs the services using the established PDU session.

In the description of the present disclosure, the term, such as "part" or "portion" or the term ending with a suffix, such as "-er" "-or" or "-ar" may be interchangeably replaced with another term, such as "circuit (circuitry)," "device," "unit," or "module."

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module and one or more antennas. The RF module may include an amplifier, an RF modulator/demodulator, or the like. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as, e.g., a base station, an access point, and any other apparatus, device or system that communicates with or controls apparatuses such as those in the above non-limiting examples.

A terminal according to an exemplary embodiment of the present disclosure includes: transmission circuitry, which, in operation, performs repetition transmission of a signal; and control circuitry, which, in operation, determines, in a case where a portion of the repetition transmission is not performed, either continuation of the repetition transmission or termination of the repetition transmission, based on whether a determination condition is satisfied.

In an exemplary embodiment of the present disclosure, the determination condition is a condition that uses a threshold relating to the number of times of transmission of the signal, and the control circuitry determines the continuation in a case where a sum of the number of times the signal has been transmitted before the portion of the repetition transmission and the number of times the signal is transmittable after the portion of the repetition transmission is equal to or greater than the threshold, and determines the termination in a case where the sum is less than the threshold.

In an exemplary embodiment of the present disclosure, the determination condition is a condition that uses a specified number of transmission occasions of the signal from a beginning of the repetition transmission, and the control circuitry determines the termination in a case where the portion of the repetition transmission is not performed in the transmission occasions of the specified number, and determines the continuation in a case where the repetition transmission is performed in the transmission occasions of the specified number.

In an exemplary embodiment of the present disclosure, the determination condition is a condition that uses a period corresponding to a periodicity of Configured grant transmission, and the control circuitry determines the termination of transmission after the period of the repetition transmission.

In an exemplary embodiment of the present disclosure, the determination condition is a condition that uses a second period which is longer than a first period corresponding to a periodicity of Configured grant transmission, and the control circuitry determines the termination of transmission after the second period of the repetition transmission.

In an exemplary embodiment of the present disclosure, the determination condition is a condition that uses a threshold relating to the number of times of transmission of the signal and that uses a period corresponding to a periodicity of Configured grant transmission, and the control circuitry determines the continuation in a case where a sum of the number of times the signal has been transmitted within the period before the portion of the repetition transmission and the number of times the signal is transmittable within the period after the portion of the repetition transmission is equal to or greater than the threshold, and determines the termination in a case where the sum is less than the threshold or the termination for transmission after the period.

In an exemplary embodiment of the present disclosure, the determination condition is a condition that uses a threshold relating to the number of times of transmission of the signal and that uses a second period which is longer than a first period corresponding to a periodicity of Configured grant transmission, and the control circuitry determines the continuation in a case where a sum of the number of times the signal has been transmitted within the second period before the portion of the repetition transmission and the number of times the signal is transmittable within the second period after the portion of the repetition transmission is equal to or greater than the threshold, and determines the termination in a case where the sum is less than the threshold or the termination for transmission after the second period.

In an exemplary embodiment of the present disclosure, the determination condition is a condition that uses a specified number of transmission occasions of the signal from a beginning of the repetition transmission and that uses a period corresponding to a periodicity of Configured grant transmission, and the control circuitry determines the termination in a case where the portion of the repetition transmission is not performed in the transmission occasions of the specified number within the period, and determines the continuation in a case where the repetition transmission is performed in the transmission occasions of the specified number within the period.

In an exemplary embodiment of the present disclosure, the determination condition is a condition that uses a specified number of transmission occasions of the signal from a beginning of the repetition transmission and that uses a second period which is longer than a first period corresponding to a periodicity of Configured grant transmission, and the control circuitry determines the termination in a case where the portion of the repetition transmission is not performed in the transmission occasions of the specified number within the second period, and determines the continuation in a case where the repetition transmission is performed in the transmission occasions of the specified number within the second period.

In an exemplary embodiment of the present disclosure, a parameter used for the determination condition is a value that is specified by standards or a value that is indicated from a base station to the terminal.

In an exemplary embodiment of the present disclosure, the parameter is a value that does not depend on the number of times of the repetition transmission.

In an exemplary embodiment of the present disclosure, the parameter is a value that depends on the number of times of the repetition transmission.

In an exemplary embodiment of the present disclosure, the parameter is a value that depends on the number of times of the repetition transmission and the number of symbols to which demodulation reference signals are mapped in each slot for performing the repetition transmission.

In an exemplary embodiment of the present disclosure, the parameter is indicated from a base station to the terminal by at least one of Radio Resource Control (RRC), a Medium Access Control-Control Element (MAC-CE), and Activation Downlink Control Information (DCI).

In an exemplary embodiment of the present disclosure, the parameter is a value that is determined based on indication information different from information on the determination condition.

A base station according to an exemplary embodiment of the present disclosure includes: reception circuitry, which, in operation, performs reception of repetition transmission of a signal; and control circuitry, which, in operation, determines, in a case where a portion of the repetition transmission is not performed, either continuation of the repetition transmission or termination of the repetition transmission, based on whether a determination condition is satisfied.

A communication method according to an exemplary embodiment of the present disclosure includes: performing, by a terminal, repetition transmission of a signal; and determining, by the terminal, in a case where a portion of the repetition transmission is not performed, either continuation of the repetition transmission or termination of the repetition transmission, based on whether a determination condition is satisfied.

A communication method according to an exemplary embodiment of the present disclosure includes: performing, by a base station, reception of repetition transmission of a signal; and determining, by the base station, in a case where a portion of the repetition transmission is not performed, either continuation of the repetition transmission or termination of the repetition transmission, based on whether a determination condition is satisfied.

The disclosure of Japanese Patent Application No. 2021-126684, filed on Aug. 2, 2021, including the specification, drawings and abstract, is incorporated herein by reference in its entirety.

INDUSTRIAL APPLICABILITY

An exemplary embodiment of the present disclosure is useful for radio communication systems.

REFERENCE SIGNS LIST

100 Base station
101, 205 Controller
102 Higher-layer control signal generator
103 Downlink control information generator
104, 206 Encoder
105, 207 Modulator
106, 208 Signal assigner
107, 209 Transmitter
108, 201 Receiver
109, 202 Extractor
110, 203 Demodulator
111, 204 Decoder
200 Terminal

The invention claimed is:

1. A terminal, comprising:
transmission circuitry, which, in operation, performs repetition transmission of a signal in a plurality of slots; and
control circuitry, which, in operation,
determines whether or not to perform the repetition transmission in a portion of the plurality of slots;
determines, in response to determining to perform the repetition transmission in the portion of the plurality of slots, to continue transmission of the repetition transmission after the portion of the plurality of slots;
determines, in response to determining to not perform the repetition transmission in the portion of the plurality of slots, either (i) to continue transmission of the repetition transmission or (ii) to terminate transmission of the repetition transmission after the portion of the plurality of slots, by using a determination condition for determining whether to continue the repetition transmission or to terminate the repetition transmission;

continues the repetition transmission in response to determining to continue transmission of the repetition transmission; and terminates the repetition transmission in response to determining to terminate transmission of the repetition transmission, wherein, the determination condition is a condition that uses a threshold relating to the repetition transmission of the signal, the control circuitry determines to continue transmission of the repetition transmission in a case where a sum of (i) a number of times the signal has been transmitted before the portion of the plurality of slots and (ii) a number of available times for transmission of the signal after the portion of the plurality of slots, is equal to or greater than the threshold, and the control circuitry determines to terminate transmission of the repetition transmission in a case where the sum is less than the threshold.

2. The terminal according to claim 1, wherein:

the determination condition is a condition that uses a specified number of transmission occasions of the signal from a beginning of the repetition transmission, the control circuitry determines to terminate transmission of the repetition transmission in a case where the repetition transmission in the portion of the plurality of slots is not performed in the specified number of transmission occasions of the signal, and the control circuitry determines to continue transmission of the repetition transmission in a case where the repetition transmission is performed in the specified number of transmission occasions of the signal.

3. The terminal according to claim 1, wherein:

the determination condition is a condition that uses a time length given by a periodicity of a configured grant transmission, the terminal is configured to transmit, in the configured grant transmission, a Physical Uplink Shared Channel (PUSCH) with a resource designated in advance, and the control circuitry determines to terminate transmission of the repetition transmission after the time length.

4. The terminal according to claim 1, wherein:

the determination condition is a condition that uses a second time length, which is longer than a first time length given by a periodicity of a configured grant transmission, the terminal is configured to transmit, in the configured grant transmission, a Physical Uplink Shared Channel (PUSCH) with a resource designated in advance, and the control circuitry determines to terminate transmission of the repetition transmission after the second time length.

5. The terminal according to claim 1, wherein:

the determination condition is a condition that uses a time length given by a periodicity of a configured grant transmission, the terminal is configured to transmit, in the configured grant transmission, a Physical Uplink Shared Channel (PUSCH) with a resource designated in advance, the control circuitry determines to continue transmission of the repetition transmission in a case where a sum of (i) a number of times the signal has been transmitted within the time length before the portion of the repetition transmission and (ii) a number of available times for transmission of the signal within the time length after the portion of the repetition transmission, is equal to or greater than the threshold, and the control circuitry determines to terminate transmission of the repetition transmission in a case where the sum is less than the threshold, or determines the termination of the repetition transmission after the time length.

6. The terminal according to claim 1, wherein:

the determination condition is a condition that uses a second time length, which is longer than a first time length given by a periodicity of a configured grant transmission, the terminal is configured to transmit, in the configured grant transmission, a Physical Uplink Shared Channel (PUSCH) with a resource designated in advance, the control circuitry determines to continue transmission of the repetition transmission in a case where a sum of (i) a number of times the signal has been transmitted within the second time length before the portion of the plurality of slots and (ii) a number of available times for transmission of the signal within the second time length after the portion of the plurality of slots, is equal to or greater than the threshold, and the control circuitry determines to terminate transmission of the repetition transmission in a case where the sum is less than the threshold, or determines the termination of the repetition transmission after the second time length.

7. The terminal according to claim 1, wherein:

the determination condition is a condition that uses a specified number of transmission occasions of the signal from a beginning of the repetition transmission and that uses a time length given by a periodicity of a configured grant transmission, the terminal is configured to transmit, in the configured grant transmission, a Physical Uplink Shared Channel (PUSCH) with a resource designated in advance, the control circuitry determines to terminate transmission of the repetition transmission in a case where the repetition transmission in the portion of the plurality of slots is not performed in the specified number of transmission occasions within the time length, and the control circuitry determines to continue transmission of the repetition transmission in a case where the repetition transmission is performed in the specified number of transmission occasions of the signal within the time length.

8. The terminal according to claim 1, wherein:

the determination condition is a condition that uses a specified number of transmission occasions of the signal from a beginning of the repetition transmission and that uses a second time length, which is longer than a first time length given by a periodicity of a configured grant transmission, the terminal is configured to transmit, in the configured grant transmission, a Physical Uplink Shared Channel (PUSCH) with a resource designated in advance, the control circuitry determines to terminate transmission of the repetition transmission in a case where the repetition transmission in the portion of the plurality of slots is not performed in the specified number of transmission occasions within the second time length, and the control circuitry determines to continue transmission of the repetition transmission in a case where the repetition transmission is performed in the specified number of transmission occasions of the signal within the second time length.

9. The terminal according to claim 1, wherein a parameter used for the determination condition is a value that is specified by standards or a value that is indicated from a base station to the terminal.

10. The terminal according to claim 9, wherein the parameter is a value that is independent of a number of times of the repetition transmission.

11. The terminal according to claim 9, wherein the parameter is a value that is indicated by indication information different from information on the determination condition.

12. A base station, comprising:
reception circuitry, which, in operation, performs reception of repetition transmission of a signal in a plurality of slots; and
control circuitry, which, in operation,
    determines whether or not to perform reception of the repetition transmission in a portion of the plurality of slots;
    determines, in response to determining to perform reception of the repetition transmission in the portion of the plurality of slots, to continue reception of the repetition transmission after the portion of the plurality of slots;
    determines, in response to determining to not perform reception of the repetition transmission in the portion of the plurality of slots, either (i) to continue reception of the repetition transmission or (ii) to terminate reception of the repetition transmission after the portion of the plurality of slots, by using a determination condition for determining whether to continue reception of the repetition transmission or to terminate reception of the repetition transmission;
    continues reception of the repetition transmission in response to determining to continue reception of the repetition transmission; and
    terminates reception of the repetition transmission in response to determining to terminate reception of the repetition transmission, wherein
the determination condition is a condition that uses a threshold relating to the repetition transmission of the signal,
the control circuitry determines to continue reception of the repetition transmission in a case where a sum of (i) a number of times the signal has been received before the portion of the plurality of slots and (ii) a number of available times for reception of the signal after the portion of the plurality of slots, is equal to or greater than the threshold, and
the control circuitry determines to terminate reception of the repetition transmission in a case where the sum is less than the threshold.

13. A communication method, comprising:
performing, by a terminal, repetition transmission of a signal in a plurality of slots;
determining, by the terminal, whether or not to perform the repetition transmission in a portion of the plurality of slots;
determining, by the terminal, in response to determining to perform the repetition transmission in the portion of the plurality of slots, to continue transmission of the repetition transmission after the portion of the plurality of slots;

determining, by the terminal, in response to determining to not perform the repetition transmission in the portion of the plurality of slots, either (i) to continue transmission of the repetition transmission or (ii) terminate transmission of the repetition transmission after the portion of the plurality of slots, by using a determination condition for determining whether to continue the repetition transmission or to terminate the repetition transmission;
continuing, by the terminal, the repetition transmission in response to determining to continue the repetition transmission; and
terminating, by the terminal, the repetition transmission in response to determining to terminate the repetition transmission, wherein
the determination condition is a condition that uses a threshold relating to the repetition transmission of the signal,
continuation of the repetition transmission is determined in a case where a sum of (i) a number of times the signal has been transmitted before the portion of the plurality of slots and (ii) a number of available times for transmission of the signal after the portion of the plurality of slots, is equal to or greater than the threshold, and
termination of the repetition transmission is determined in a case where the sum is less than the threshold.

14. A communication method, comprising:
performing, by a base station, reception of repetition transmission of a signal in a plurality of slots;
determining, by the base station, whether or not to perform reception of the repetition transmission in a portion of the plurality of slots;
determining, by the base station, in response to determining to perform reception of the repetition transmission in the portion of the plurality of slots, to continue reception of the repetition transmission after the portion of the plurality of slots;
determining, by the base station, in response to determining to not perform reception of the repetition transmission in the portion of the plurality of slots, either (i) to continue reception of the repetition transmission or (ii) to terminate reception of the repetition transmission after the portion of the plurality of slots, by using a determination condition for determining whether to continue reception of the repetition transmission or to terminate reception of the repetition transmission;
continuing, by the base station, reception of the repetition transmission in response to determining to continue reception of the repetition transmission; and
terminating, by the base station, reception of the repetition transmission in response to determining to terminate reception of the repetition transmission, wherein,
the determination condition is a condition that uses a threshold relating to the repetition transmission of the signal,
continuation of reception of the repetition transmission is determined in a case where a sum of (i) a number of times the signal has been received before the portion of the plurality of slots and (ii) a number of available times for reception of the signal after the portion of the plurality of slots, is equal to or greater than the threshold, and
termination of reception of the repetition transmission is determined in a case where the sum is less than the threshold.

* * * * *